United States Patent
Tange et al.

(10) Patent No.: US 8,457,868 B2
(45) Date of Patent: Jun. 4, 2013

(54) LANE KEEPING ASSIST DEVICE AND LANE KEEPING ASSIST METHOD

(75) Inventors: Satoshi Tange, Fujisawa (JP); Takeshi Kimura, Yokohama (JP); Yuya Takeda, Sagamihara (JP); Yukinori Nishida, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 290 days.

(21) Appl. No.: 12/920,733

(22) PCT Filed: Dec. 10, 2008

(86) PCT No.: PCT/JP2008/072372
§ 371 (c)(1),
(2), (4) Date: Sep. 2, 2010

(87) PCT Pub. No.: WO2009/110151
PCT Pub. Date: Sep. 11, 2009

(65) Prior Publication Data
US 2011/0015850 A1 Jan. 20, 2011

(30) Foreign Application Priority Data

Mar. 4, 2008 (JP) .................. 2008-053397
Jul. 23, 2008 (JP) .................. 2008-190120

(51) Int. Cl.
*G06F 7/00* (2006.01)
(52) U.S. Cl.
USPC ............................ 701/116; 701/41

(58) Field of Classification Search
USPC ............... 701/41–42, 300–302, 116–119
See application file for complete search history.

(56) References Cited

U.S. PATENT DOCUMENTS

| 7,206,684 | B2 | 4/2007 | Takeda |
| 7,539,566 | B2 | 5/2009 | Tange et al. |
| 7,890,231 | B2 * | 2/2011 | Saito et al. ................ 701/41 |
| 2005/0046579 | A1 * | 3/2005 | Oyama ................ 340/575 |
| 2006/0142921 | A1 | 6/2006 | Takeda |
| 2006/0149448 | A1 | 7/2006 | Tange et al. |
| 2007/0233343 | A1 * | 10/2007 | Saito et al. ................ 701/41 |
| 2010/0100284 | A1 * | 4/2010 | Kudo et al. ................ 701/42 |

FOREIGN PATENT DOCUMENTS

| JP | 7-215144 A | 8/1995 |
| JP | 11-189166 A | 7/1999 |
| JP | 2003-327151 A | 11/2003 |
| JP | 2006-143096 A | 6/2006 |
| JP | 2006-175958 A | 7/2006 |
| JP | 2006-206032 A | 8/2006 |

* cited by examiner

*Primary Examiner* — Yonel Beaulieu
(74) *Attorney, Agent, or Firm* — Foley & Lardner LLP

(57) ABSTRACT

Lateral displacement reference positions LXL, LXR are set on left and right from a center in a width direction of a traffic lane L where a vehicle travels. Then, at least in a case where the vehicle is positioned on an inner side of the left and right lateral displacement reference position LXL, LXR, the vehicle is feedback-controlled so as to decrease a yaw angle deviation. Further, in a case where the vehicle is positioned at an outer side of the left and right lateral displacement reference position LXL, LXR with respect to the traffic lane center, the feedback control is performed so as to decrease the angle deviation and a lateral displacement deviation.

28 Claims, 15 Drawing Sheets

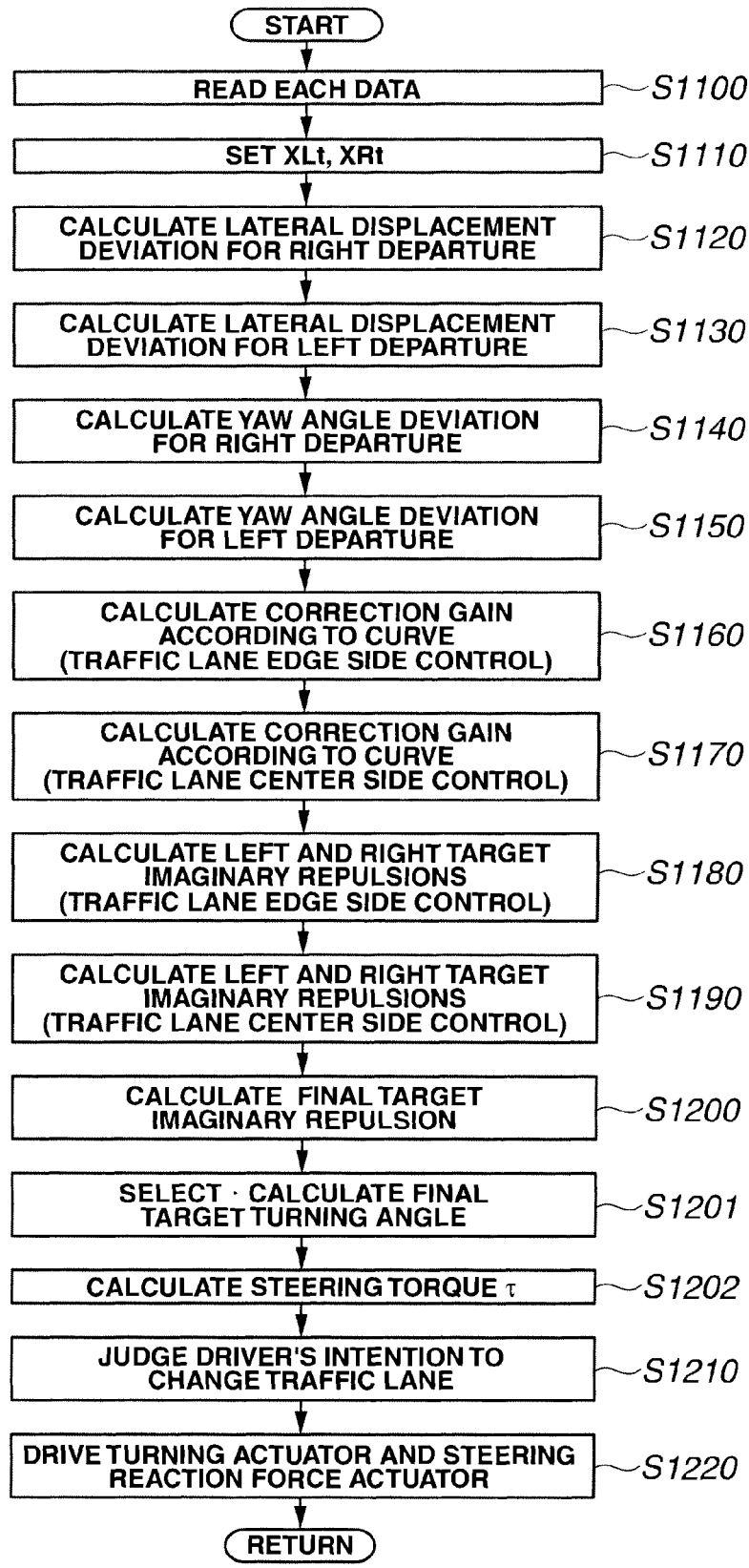

LANE KEEPING ASSIST DEVICE AND LANE KEEPING ASSIST METHOD

TECHNICAL FIELD

The present invention relates to a lane keeping assist device and a lane keeping assist method which enable a vehicle to travel along a traffic lane and prevent the vehicle from departing from the traffic lane.

BACKGROUND ART

As a lane keeping assist device, for example, its invention has been disclosed in a Patent Document 1.

An art disclosed in this Patent Document 1 is an art that controls a turning angle of steered road wheels so that an angle deviation between a travelling direction of the vehicle and the traffic lane decreases. An object of the invention in Patent Document 1 is to prevent the vehicle from departing from the traffic lane.

Patent Document 1: Japanese Patent No. JP3729494

SUMMARY OF THE INVENTION

As described in the Patent Document 1, in a case where the travelling direction of the vehicle is merely controlled so that the angle deviation with respect to the traffic lane becomes zero, the same control is executed in both situations; a situation where the angle deviation to a departure side occurs and a situation where the angle deviation to a departure avoidance side occurs.

Here, in the following, as an example, a situation where the vehicle is in a position where the vehicle approaches one edge side of the traffic lane will be explained.

For instance, assuming that a control gain is set large in order to ensure a departure prevention effect, in this case, in the situation where the angle deviation to the departure side (the travelling direction of the vehicle is a direction approaching the above one edge side of the traffic lane) occurs, a control amount to the departure avoidance side becomes large, then the departure can be prevented more effectively. However, in the situation where the angle deviation to the departure avoidance side (the travelling direction of the vehicle is a direction moving away from the above one edge side) occurs, a control to the departure side strongly intervenes. That is, there is a possibility that this will give an occupant an awkward feeling or an odd feeling which the occupant feels as if the control to the departure side intervenes.

Conversely, in order to lessen the awkward feeling of the control intervention when the angle deviation to the departure avoidance side occurs, if the control gain is set small, the control intervention when the angle deviation to the departure side occurs becomes weak, and the departure prevention effect is reduced.

In this way, in the above related art, there is a trade-off between the departure prevention effect upon the occurrence of the angle deviation to the departure side and the awkward feeling of the control intervention upon the occurrence of the angle deviation to the departure avoidance side.

Further, in the related art, because the travelling direction of the vehicle is merely controlled so that the angle deviation becomes zero, the control ends at a time when the travelling direction of the vehicle becomes parallel with the traffic lane. For this reason, in a case where the departure from the traffic lane of the vehicle cannot be completely prevented by the above control because, for example, the angle deviation with respect to the traffic lane of the vehicle is large or a lateral velocity with respect to the traffic lane is large, the following problem arises.

That is, although the vehicle is departing from the traffic lane, the control ends at the time when the vehicle becomes parallel with the traffic lane, then there is a problem that effects of returning the vehicle within the traffic lane and keeping the vehicle within the traffic lane are lacking.

The present invention focuses attention on the above points, and an object of the present invention is to provide a lane keeping assist device which is capable of effectively preventing the traffic lane departure while lessening the awkward feeling caused by difference from a driving line of driver's intention to drive.

In order to solve the problem, in the present invention, a lateral direction displacement threshold value is provided in the traffic lane on which the vehicle is travelling. And when the vehicle passes across the lateral direction displacement threshold value from a center side of the traffic lane, the travelling direction of the vehicle is controlled so that, at a traffic lane center side with respect to the lateral direction displacement threshold value, the angle deviation with respect to the traffic lane decreases, and the travelling direction of the vehicle is controlled so that, at an outer side in a width direction of the traffic lane with respect to the lateral direction displacement threshold value, at least a lateral displacement deviation from the lateral direction displacement threshold value decreases.

BRIEF DESCRIPTION OF THE DRAWINGS

FIG. 16 is a drawing for explaining a process in a lane keeping assist controller according to a third embodiment of the present invention.

DETAILED DESCRIPTION

According to the present invention, in a case where the vehicle is positioned at a traffic lane center side, by executing a control so that an angle deviation decreases, a vehicle travels along a traffic lane according to a driving line of driver's intention to drive.

On the other hand, in a case where the vehicle is positioned at an edge side of the traffic lane, since a control that returns the vehicle to the traffic lane center side intervenes, it is possible to keep the vehicle within the traffic lane properly.

As described above, according to the present invention, it is possible to effectively prevent the traffic lane departure while lessening an awkward feeling or an odd feeling caused by difference from the driving line of driver's intention to drive.

Next, an embodiment of the present invention will be explained with reference to the drawings.

Figure 1:
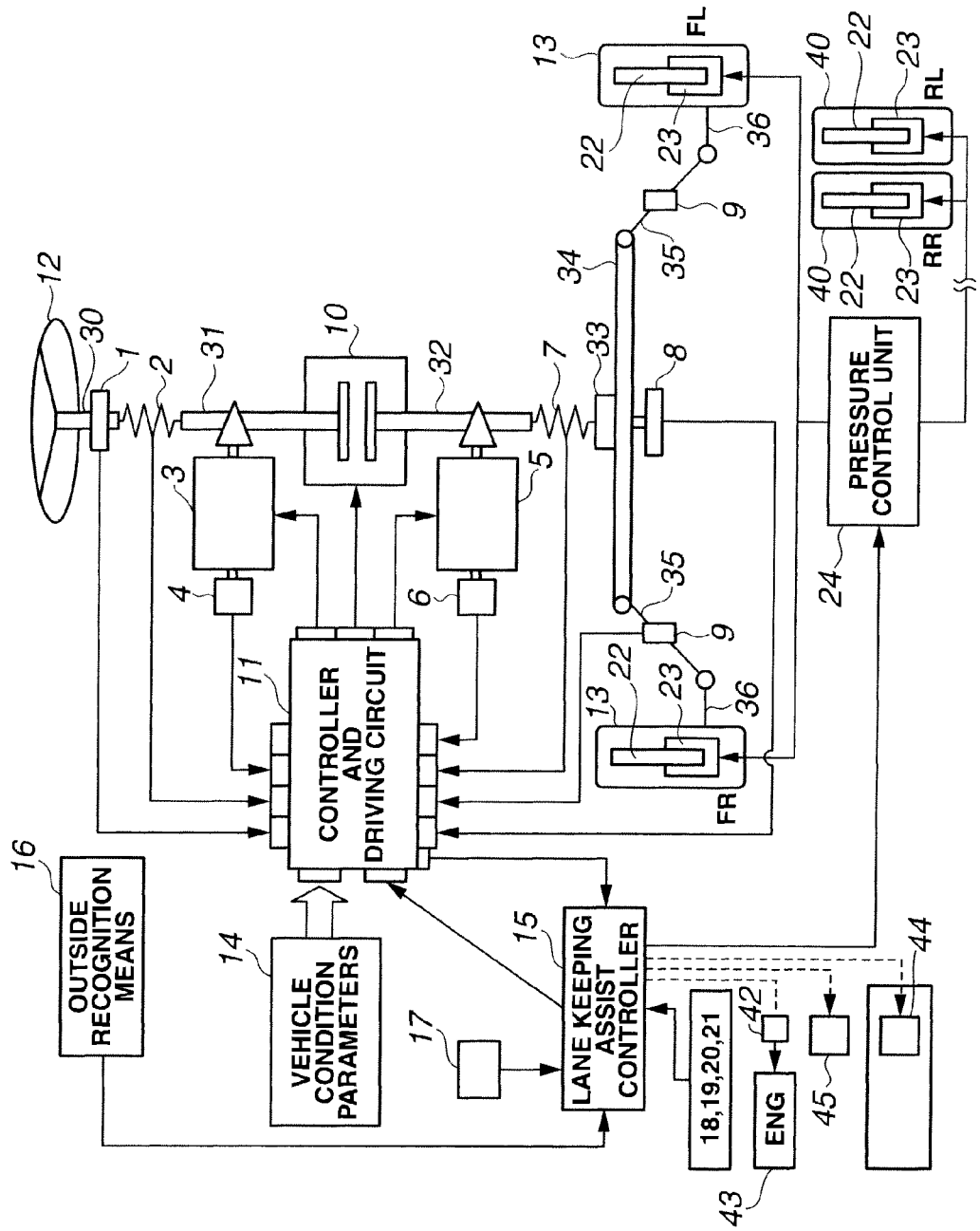
FIG. 1 is a drawing for explaining a system configuration of a vehicle according to a first embodiment of the present invention.

FIG. 1 is a schematic view of a system configuration of a vehicle to which a lane keeping assist device of the present embodiment is applied.

The vehicle in this embodiment employs a steer-by-wire system.

(Configuration)

First, configuration will be explained with reference to FIG. 1.

A steering wheel 12 which a driver operates connects with a steering input shaft 30. The steering input shaft 30 is provided with a steering wheel angle sensor 1 that detects a steering angle of the steering wheel 12. The steering wheel angle sensor 1 outputs a detected steering angle signal to a steering controller 11.

A first countershaft 31 is connected to the steering input shaft 30 via a steering torque sensor 2. The steering torque sensor 2 detects a steering torque inputted to the steering input shaft 30, and outputs its torque signal to the steering controller 11.

A steering reaction force actuator 3 is connected with the first countershaft 31. The steering reaction force actuator 3 adds a steering reaction force to the first countershaft 31 on the basis of a command from the steering controller 11. A steering reaction force motor angle sensor 4 is provided at a steering reaction force motor of the steering reaction force actuator 3. The steering reaction force motor angle sensor 4 detects a rotation angle position of the steering reaction force motor, and outputs its detection signal to the steering controller 11.

A second countershaft 32 is connected to the first countershaft 31 via a mechanical back-up unit 10. In a normal state, the mechanical back-up unit 10 disconnects torque transmission between the first countershaft 31 and the second countershaft 32. And on the basis of a command from the steering controller 11, the mechanical back-up unit 10 connects the first countershaft 31 and the second countershaft 32 and allows the torque transmission.

The second countershaft 32 connects to a steering output shaft 33 via a turning torque sensor 7. Further, a turning actuator 5 is connected with the second countershaft 32. The turning actuator 5 rotates the second countershaft 32 on the basis of a command from the steering controller 11. A turning actuator angle sensor 6 is provided at a turning motor of the turning actuator 5. The turning actuator angle sensor 6 detects a rotation angle position of the motor of the turning actuator 5, and outputs its detection signal to the steering controller 11.

The steering output shaft 33 connects to a rack shaft 34 via a rack-and-pinion mechanism. That is, a pinion that is connected with the steering output shaft 33 is engaged with a rack of the rack shaft 34. The rack shaft 34 is placed with its shaft direction being a vehicle width direction. Then by rotating the steering output shaft 33, the rack shaft 34 moves in the shaft direction of the vehicle width direction. A reference sign 8 denotes a pinion angle sensor. The pinion angle sensor 8 detects a rotation angle of the pinion, and outputs it to the steering controller 11.

Left and right ends of the rack shaft 34 connect to respective left and right knuckles via respective left and right tie rods 35. A reference sign 36 denotes a knuckle arm that protrudes from the knuckle. The knuckle rotatably supports a front road wheel 13 that is a steering control wheel. The tie rod 35 is provided with a tie rod axial force sensor 9. The tie rod axial force sensor 9 detects an axial force of the tie rod 35, and outputs its detection signal to the steering controller 11.

Further, vehicle condition parameters 14 are inputted to the steering controller 11. The vehicle condition parameters 14 are, for example, a vehicle speed that is detected by a vehicle speed detection means and a friction coefficient estimation value of a travelling road which is detected by a road friction coefficient estimation means.

The steering controller 11 outputs a turning command value of a turning angle, which corresponds to the steering angle detected by the steering wheel angle sensor 1, to the turning actuator 5. The steering controller 11 also outputs a command value for adding the steering reaction force, to the steering reaction force actuator 3. Here, when the steering controller 11 inputs a turning command of a correction amount from an after-mentioned lane keeping assist controller 15, the steering controller 11 corrects the turning command value by adding the correction turning command to the turning command value.

Further, a brake unit is provided for each road wheel of the front road wheels 13 and rear road wheels 40. Each brake unit has a brake disc 22 and a wheel cylinder 23 that gives a braking force by sandwiching the brake disc 22 therebetween through supply of fluid pressure. Each wheel cylinder 23 of the brake unit is connected to a pressure control unit 24. Then the brake units separately provide the braking to the respective road wheels by the fluid pressure supplied from the pressure control unit 24.

Furthermore, a driving-motor 43 which is an engine or a motor and drives driving road wheels and a drive controller 42 that controls the drive of the driving-motor 43, are provided.

The drive controller 42 corrects a drive amount by an amount of a correction command from the lane keeping assist controller 15.

A reference sign 44 denotes a lamp in a meter cluster mounted in the front of a driver's seat. A reference sign 45 denotes a warning device provided in a cabin.

The lane keeping assist device is provided for the vehicle having the above system configuration.

The configuration will be explained next.

A monocular camera with image processing function is mounted on the vehicle. This monocular camera with image processing function is an outside recognition means 16 to detect a position of the vehicle. The monocular camera with image processing function captures the road ahead of the vehicle. The monocular camera judges a road condition from the captured camera image, and outputs a signal concerning the vehicle position in the traffic lane where the vehicle is travelling to the lane keeping assist controller 15. The signal concerning the vehicle position in the traffic lane is information about a yaw angle that is an angle deviation of a travelling direction of the vehicle with respect to the traffic lane, a lateral displacement X from the traffic lane center and a curvature ρ of the traffic lane.

Further, a direction indicator switch 17 is provided. A signal of the direction indicator switch 17 is outputted to the lane keeping assist controller 15 as judgment information as to whether the driver changes the traffic lane.

The lane keeping assist controller 15 inputs signals such as a current steering state and a steering state of the road wheel from the steering controller 11.

The lane keeping assist controller 15 calculates a control amount for keeping the vehicle in the traffic lane on the basis of the input signals, and outputs them at least to the steering controller 11.

Figure 2:
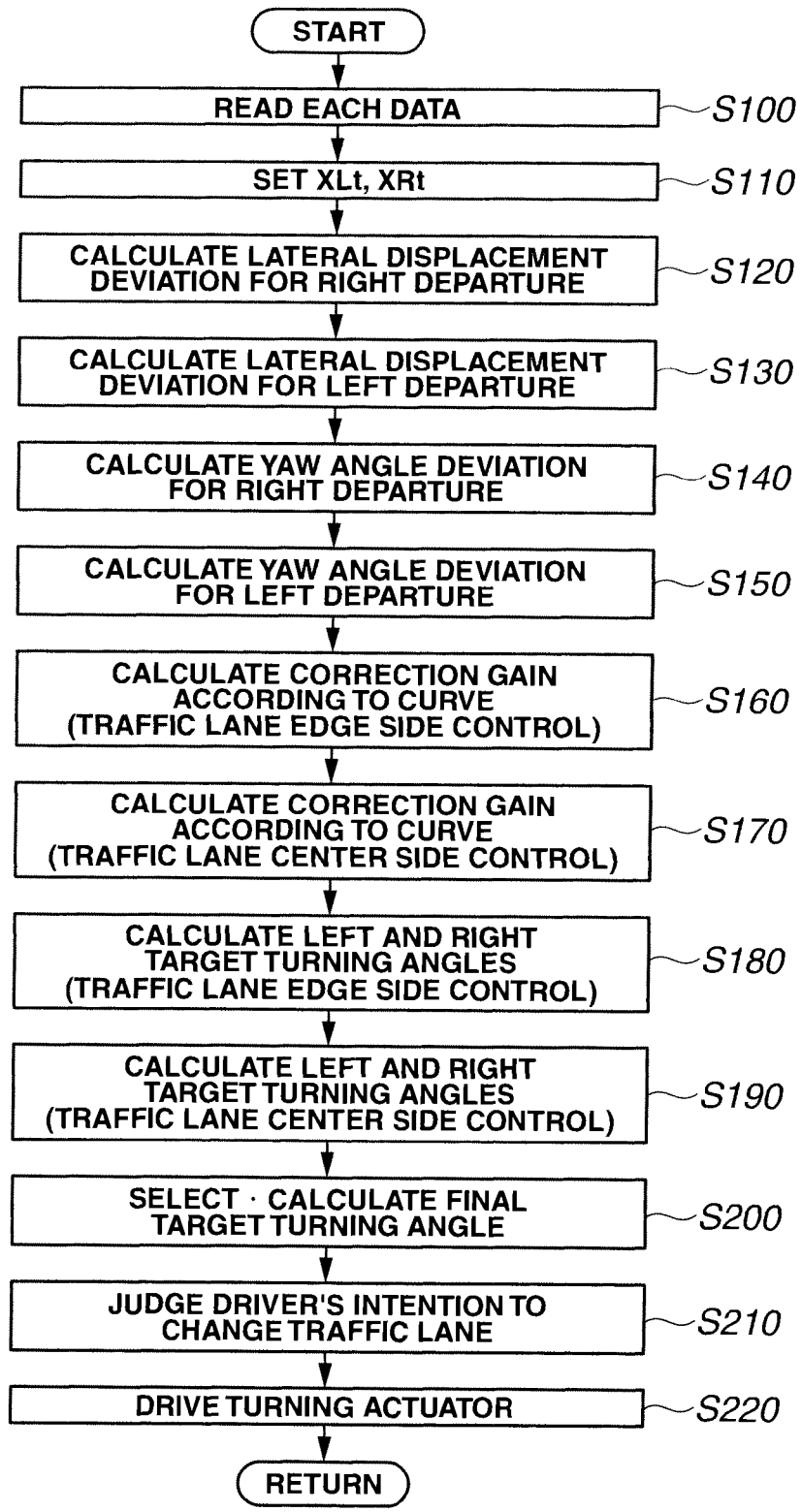
FIG. 2 is a drawing for explaining a process in a lane keeping assist controller according to the first embodiment of the present invention.

Next, process in the lane keeping assist controller 15 will be explained with reference to FIG. 2.

This lane keeping assist controller 15 performs the process repeatedly at certain sampling intervals.

Upon a start of the process, at step S100, each data from each sensor and the steering controller 11 etc. is read. Each road wheel speed Vw from road wheel speed sensors 18~21 is read. Further, a steering angle δ, a steering angular velocity δ' and the signal of the direction indicator switch 17 are read. The yaw angle θ of the vehicle with respect to a traffic lane L, the lateral displacement X from a traffic lane center Ls and the curvature ρ of the traffic lane L, from a camera controller of the outside recognition means 16, are each read.

Figure 3:
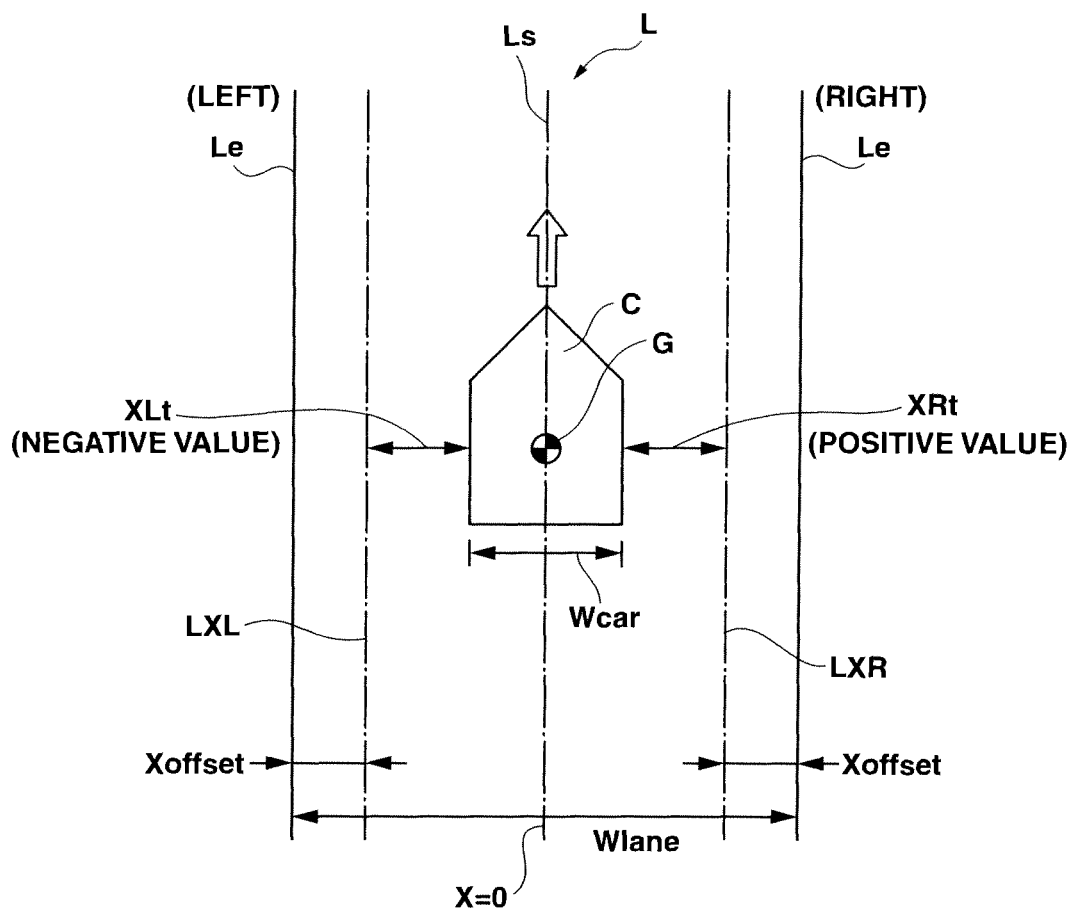
FIG. 3 is a top view for explaining a relationship between values according to the first embodiment of the present invention.
Figure 4:
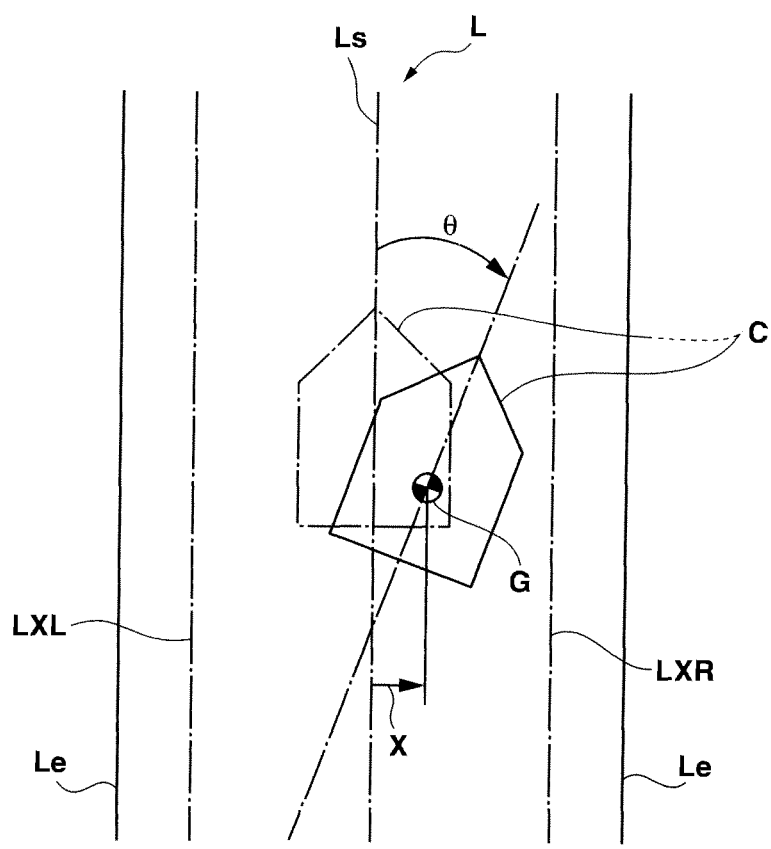
FIG. 4 is a top view for explaining a relationship between values according to the first embodiment of the present invention.

Here, with regard to the lateral displacement X from the traffic lane center Ls, as shown in FIGS. 3 and 4, the lateral displacement X is determined with a position G of center of gravity of a vehicle C being a reference. However, it is also possible that the gravity center position G of the vehicle C is not the reference. For instance, the lateral displacement X from the traffic lane center is could be determined with a center of a front end portion of the vehicle C being the reference. That is, as shown in FIG. 4, first the front end portion of the vehicle C is displaced in a departure direction according to the yaw angle θ. Thus it is possible that the lateral displacement X is determined with the front end portion being the reference, then a lateral displacement deviation could be decreased earlier.

Subsequently, at step S110, on the basis of the following expression (1) and expression (2), left and right lateral displacement reference threshold values XLt, XRt are set.

Here, as shown in FIG. 3, the right side lateral displacement reference threshold value XRt is a value that defines a position of a lateral displacement reference position LXR which is a reference of deviation of the lateral displacement X set for a right departure. The left side lateral displacement reference threshold value XLt is a value that defines a position of a lateral displacement reference position LXL which is a reference of deviation of the lateral displacement X set for a left departure.

$$XRt = (Wlane/2) - (Wcar/2) - Xoffset \quad (1)$$

$$XLt = -((Wlane/2) - Wcar/2) - Xoffset) \quad (2)$$

Here, regarding the lateral displacement X from the traffic lane center Ls, it is a positive when the vehicle C is positioned at the right side with respect to the center of the traffic lane L, and it is a negative when the vehicle C is positioned at the left side with respect to the center of the traffic lane L. Therefore, the right side lateral displacement reference threshold value XRt side is set to the positive.

Further, as shown in FIG. 3, Wlane is a traffic lane width, and Wcar is a vehicle width of the vehicle C.

Xoffset is a margin to a position of a traffic lane edge side Le (a white line or a road shoulder). This margin Xoffset could be changed depending on the traffic lane width Wlane or the vehicle speed. For example, the traffic lane width Wlane is narrower, the margin Xoffset is smaller. Further, different margins Xoffset could be used for each of the left and right lateral displacement reference positions LXL, LXR. Or these left and right lateral displacement reference positions LXL, LXR could be fixed values.

Subsequently, at step S120, on the basis of the following expression (3), a lateral displacement deviation ΔXR for the right departure is calculated.

$$\Delta XR = X - XRt \quad (3)$$

Here, in a case of $\Delta XR \leq 0$, $\Delta XR = 0$ (only a positive value is taken).

Figure 5A:
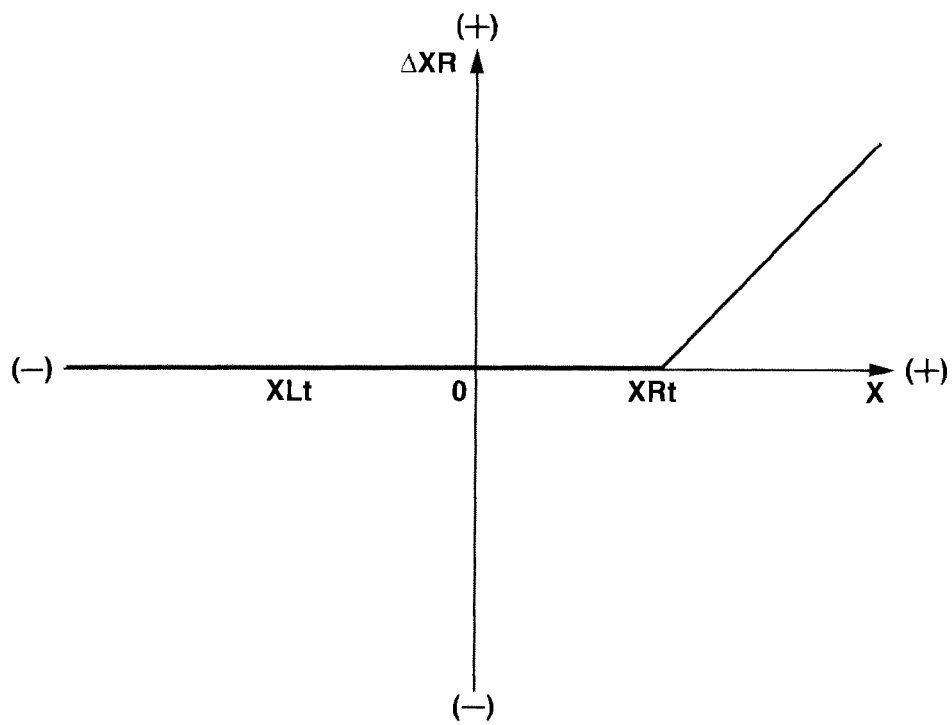
FIG. 5A is a drawing showing a relationship between a lateral displacement X and a lateral displacement deviation.

By the above expression (3), a relationship between the lateral displacement X and the lateral displacement deviation ΔXR for the right departure is given as shown in FIG. 5A.

That is, by using the expression (3), when "X−XRt" is "X−XRt≧0", it is judged that the vehicle C goes out from the right lateral displacement reference position LXR with respect to the traffic lane center Ls. This is a case where the vehicle C moves to the right side traffic lane edge side Le side. Therefore, the lateral displacement deviation ΔXR for the right departure is determined with the right side lateral displacement reference position LXR, which is the lateral displacement reference position near the vehicle C, being a reference of the lateral displacement deviation.

Subsequently, at step S130, on the basis of the following expression (4), a lateral displacement deviation ΔXL for the left departure is calculated.

$$\Delta XL = X - XLt \quad (4)$$

Here, in a case of $\Delta XL \geq 0$, $\Delta XL = 0$ (only a negative value is taken)

Figure 5B:
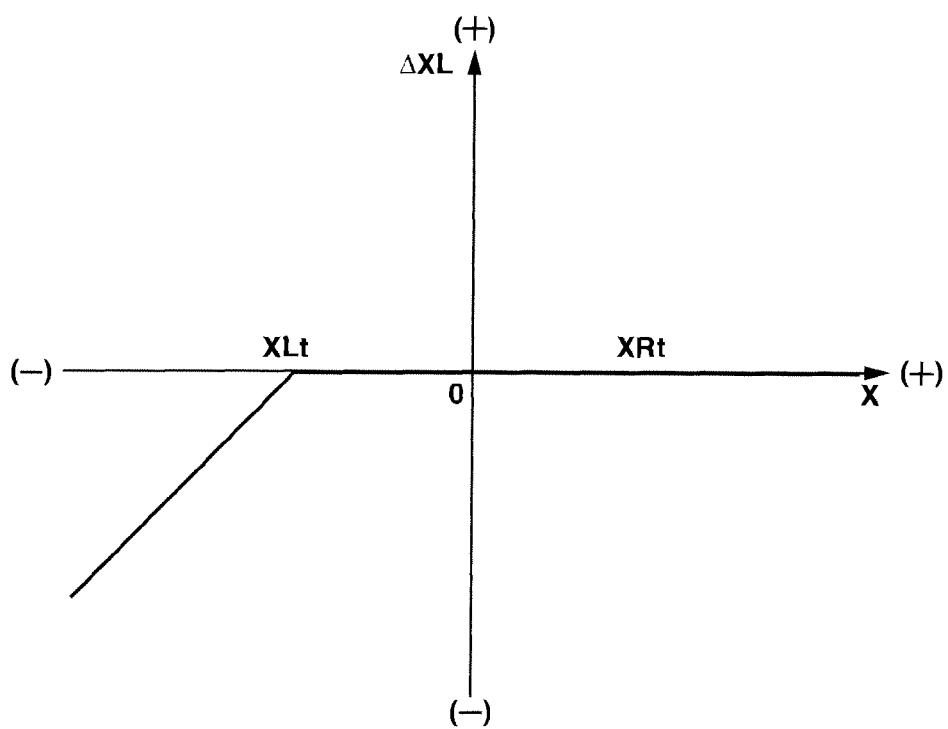
FIG. 5B is a drawing showing a relationship between a lateral displacement X and a lateral displacement deviation.

By the above expression (4), a relationship between the lateral displacement X and the lateral displacement deviation ΔXL for the left departure is given as shown in FIG. 5B.

That is, by using the expression (4), when "X−XLt" is "X−XLt≦0", it is judged that the vehicle C goes out from the left lateral displacement reference position LXL with respect to the traffic lane center Ls. This is a case where the vehicle C moves to the left side traffic lane edge side Le side. Therefore, the lateral displacement deviation ΔXL for the left departure is determined with the left side lateral displacement reference position LXL, which is the lateral displacement reference position near the vehicle C, being a reference of the lateral displacement deviation.

Subsequently, at step S140, on the basis of the following expression (5), a yaw angle deviation ΔθR for the right departure is calculated. Here, the yaw angle θ of the vehicle C with respect to the traffic lane L is a positive when the yaw angle θ to the right side is formed (state like FIG. 4). The yaw angle θ is a negative when the yaw angle θ to the left side is formed.

$$\Delta\theta R = \theta \text{ (in a case of } \theta > 0)$$

$$\Delta\theta R = 0 \text{ (in a case of } \theta \leq 0) \quad (5)$$

Figure 6A:
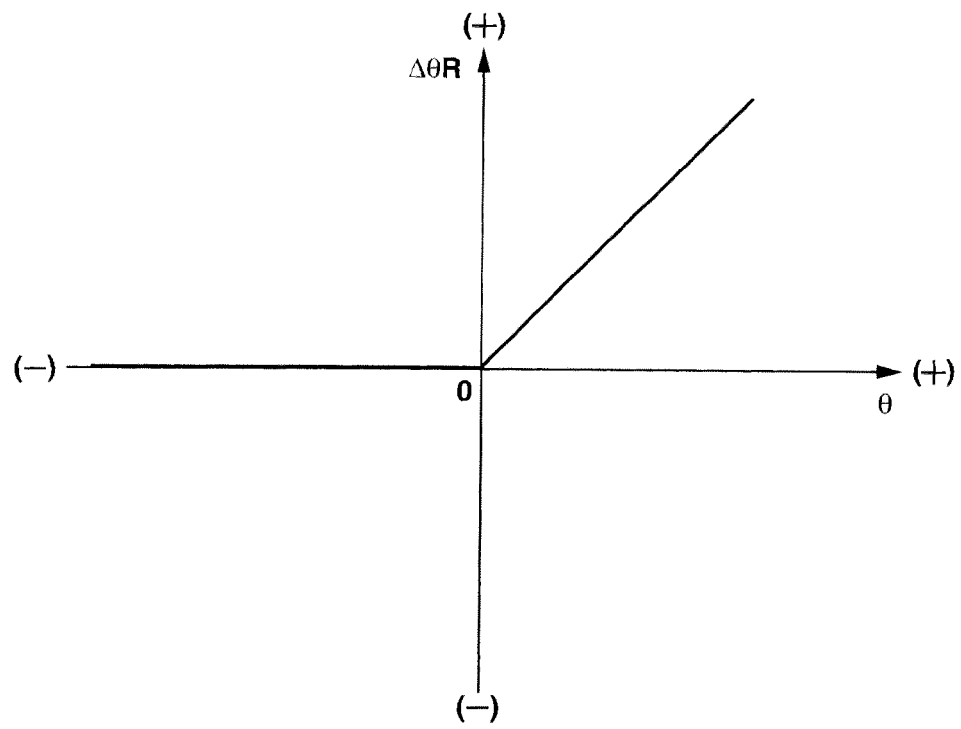
FIG. 6A is a drawing showing a relationship between a yaw angle $\theta$ and a yaw angle deviation.

By the above expression (5), a relationship between the yaw angle θ and the yaw angle deviation ΔθR set only for the right departure is given as shown in FIG. 6A.

Subsequently, at step S150, on the basis of the following expression (6), a yaw angle deviation ΔθL for the left departure is calculated.

$$\Delta\theta L = 0 \text{ (in a case of } \theta < 0)$$

$$\Delta\theta L = 0 \text{ (in a case of } \theta \geq 0) \quad (6)$$

Figure 6B:
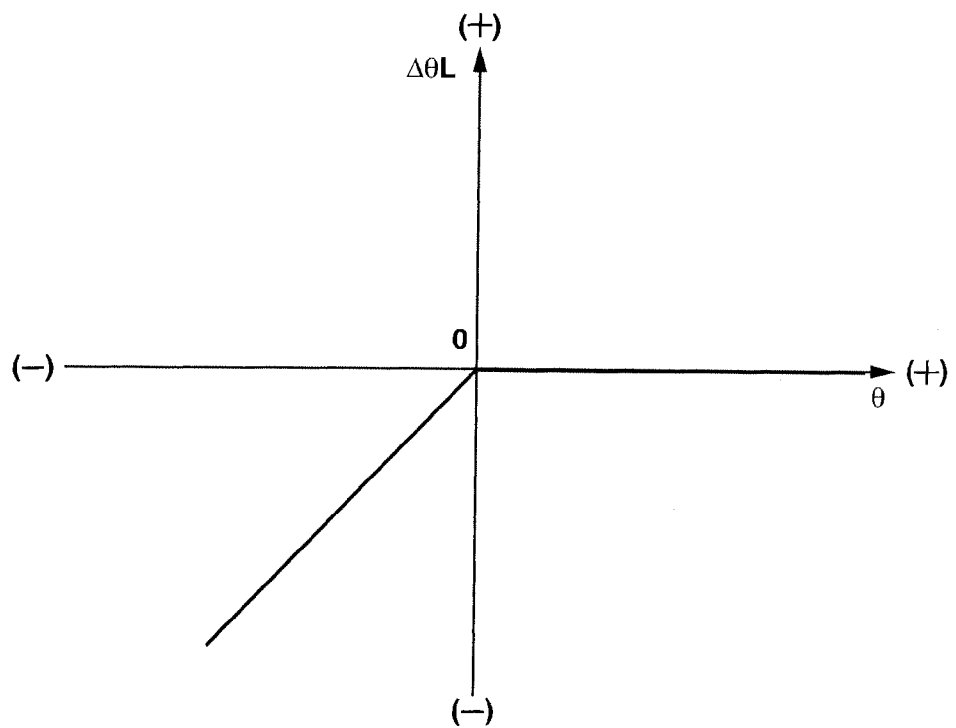
FIG. 6B is a drawing showing a relationship between a yaw angle $\theta$ and a yaw angle deviation.

By the above expression (6), a relationship between the yaw angle θ and the yaw angle deviation ΔθL set only for the left departure is given as shown in FIG. 6B.

Subsequently, at step S160, a traffic lane edge side control feedback correction gain KρL_R for the right departure and a traffic lane edge side control feedback correction gain KρL_L for the left departure, according to a direction of the curve of the traffic lane L, the curvature ρ and the direction of the yaw angle θ (departure), are each determined.

That is, depending on a direction of the curvature ρ (the curve direction of the traffic lane L), the following three cases are set, and using individual maps, the traffic lane edge side control feedback correction gain KρL_R for the right departure and the traffic lane edge side control feedback correction gain KρL_L for the left departure are set.

Figure 7:
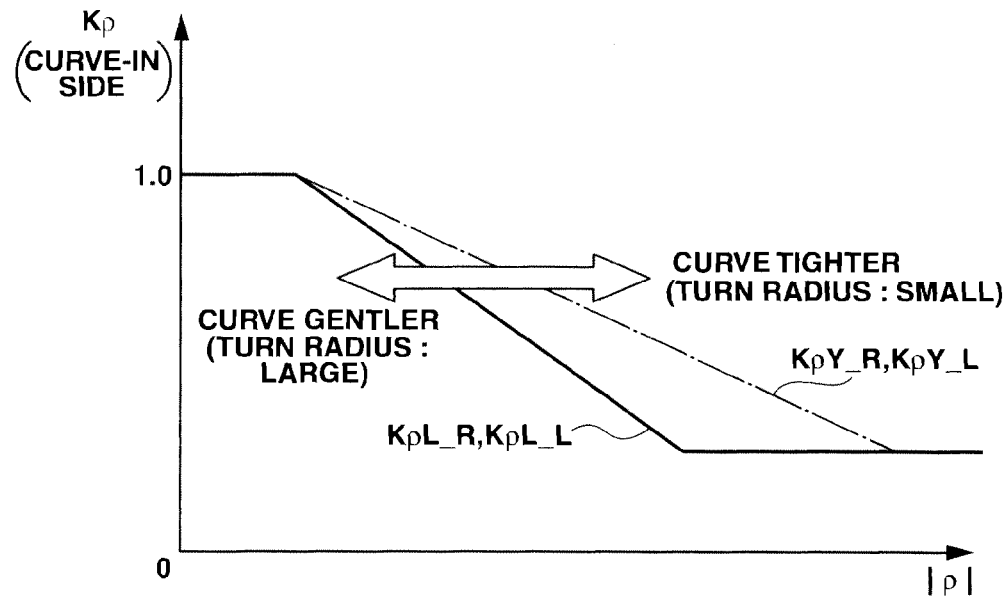
FIG. 7 is a conceptual drawing showing a curve-IN side gain map.
Figure 8:
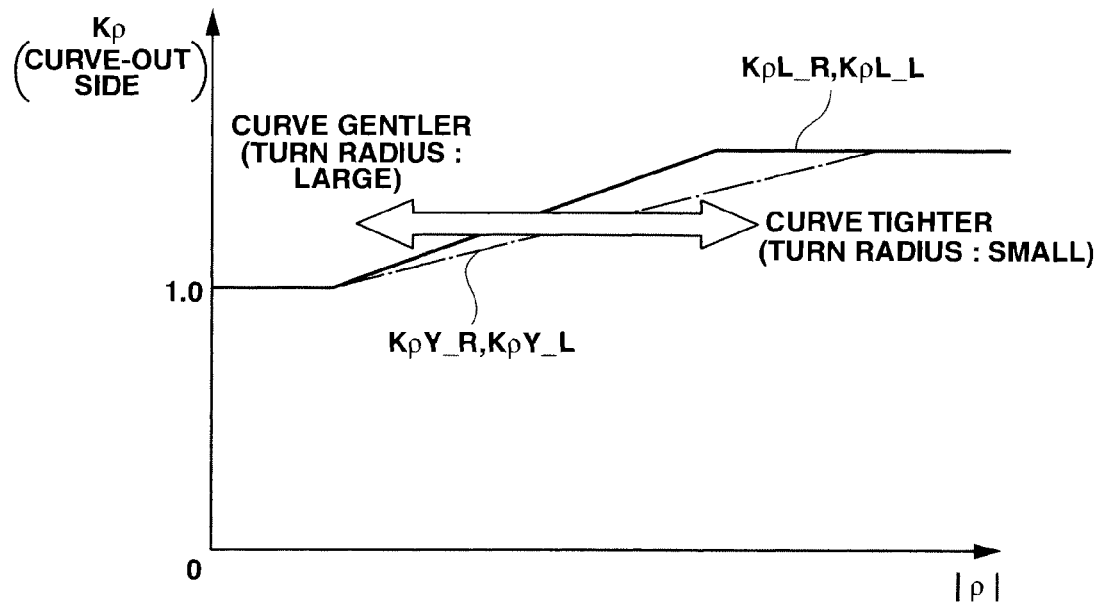
FIG. 8 is a conceptual drawing showing a curve-OUT side gain map.

In a case where the curvature ρ is judged that the curvature ρ<0 (right curve):
KρL_R: KρL_R is read from a curve-IN side correction gain map as shown in FIG. 7.
KρL_L: KρL_L is read from a curve-OUT side correction gain map as shown in FIG. 8.

In a case where the curvature ρ is judged that the curvature ρ>0 (left curve):
KρL_R: KρL_R is read from the curve-OUT side correction gain map as shown in FIG. 8.
KρL_L: KρL_L is read from the curve-IN side correction gain map as shown in FIG. 7.

In a case where the curvature ρ is judged that the curvature ρ=0 (straight road):
KρL_R=0 (no correction)
KρL_L=0 (no correction)

Here, the curvature ρ of the traffic lane L is an inverse of a turn radius. The curvature ρ is 0 at the straight road. As the curve becomes tighter (as the turn radius becomes smaller), an absolute value of the curvature ρ becomes larger. Further, the left curve is a positive, and the right curve is a negative.

As shown in FIG. 7, the curve-IN side correction gain map is a map in which when the absolute value of the curvature ρ is a certain value or more, as the absolute value of the curvature ρ becomes larger, the correction gain becomes smaller. Then the gain of the control for the traffic lane edge side Le, which is located at an inside of the curve of left and right traffic lane edge sides Le, is corrected so as to be decreased with increase in the absolute value of the curvature ρ.

As shown in FIG. 8, the curve-OUT side correction gain map is a map in which when the absolute value of the curvature ρ is a certain value or more, as the absolute value of the curvature ρ becomes larger, the correction gain becomes larger. Then the gain of the control for the traffic lane edge side Le, which is located at an outside of the curve of left and right traffic lane edge sides Le, is corrected so as to be increased with increase in the absolute value of the curvature ρ.

Subsequently, at step S170, a traffic lane center side control feedback correction gain KρY_R for the right departure and a traffic lane center side control feedback correction gain KρY_L for the left departure, according to the direction of the curve of the traffic lane L, the curvature ρ and the direction of the lateral displacement X (departure), are each determined.

That is, depending on the direction of the curvature ρ (the curve direction of the traffic lane L), the following three cases are set, and using the maps, the traffic lane center side control feedback correction gain K||Y_R for the right departure and the traffic lane center side control feedback correction gain KρY_L for the left departure are set.

In a case where the curvature ρ is judged that the curvature ρ<0 (right curve):
KρY_R: KρY_R is read from the curve-IN side correction gain map as shown in FIG. 7.
KρY_L: KρY_L is read from the curve-OUT side correction gain map as shown in FIG. 8.

In a case where the curvature ρ is judged that the curvature ρ>0 (left curve):
KρY_R: KρY_R is read from the curve-OUT side correction gain map as shown in FIG. 8.
KρY_L: KρY_L is read from the curve-IN side correction gain map as shown in FIG. 7.

In a case where the curvature ρ is judged that the curvature ρ=0 (straight road):
KρY_R=0 (no correction)
KρY_L=0 (no correction)

Here, in the case where the traffic lane edge side control feedback correction gain is determined and in the case where the traffic lane center side control feedback correction gain is determined, the curve-IN side correction gain map and the curve-OUT side correction gain map, each of which has the same trend between the both cases, are used. However, in the case where the traffic lane edge side control feedback correction gains KρL_R, KρL_L are determined and in the case where the traffic lane center side control feedback correction gains KρY_R, KρY_L are determined, the different maps whose slopes are different between the both cases are used. That is, the slope with respect to change of an absolute value of the curvature ρ in the curve-IN side correction gain map and the curve-OUT side correction gain map used for determining the traffic lane edge side control feedback correction gains KρL_R, KρL_L, is set to be greater than that for the traffic lane center side control feedback correction gains KρY_R, KρY_L. The reason why the slope for the traffic lane edge side control feedback correction gains KρL_R, KρL_L is greater is that when setting a correction amount according to the curvature ρ at the inside and outside of the curve of the traffic lane edge side Le side to be larger, response of the control becomes sensitive by an amount equivalent to this correction amount.

Subsequently, at step S180, on the basis of the following expression (7) and expression (8), a target turning angle φL_Rt by the traffic lane edge side control for the right departure and a target turning angle φL_Lt by the traffic lane edge side control for the left departure are calculated.

$$\phi L\_Rt = -(((Kc\_L1 \times Kv\_L1 \times \Delta XR) + (Kc\_L2 \times Kv\_L2 \times \theta) + (Kc\_L3 \times Kv\_L3 \times \rho)) \times K\rho L\_R) \quad (7)$$

$$\phi L\_Lt = (((Kc\_L1 \times Kv\_L1 \times \Delta XL) + (Kc\_L2 \times Kv\_L2 \times \theta) + (Kc\_L3 \times Kv\_L3 \times \rho)) \times K\rho L\_L) \quad (8)$$

Here, Kc_L1, Kc_L2, Kc_L3 are feedback gains determined by specifications of the vehicle.

Kv_L1, Kv_L2, Kv_L3 are correction gains according to the vehicle speed. For instance, Kv_L1, Kv_L2, Kv_L3 increase with the vehicle speed.

Here, a second term and a third term of the above expressions (7) and (8) are correction terms (convergence terms) for the lateral displacement deviation. Thus, the feedback gains Kc_L2, Kc_L3 are set to be smaller than the feedback gain Kc_L1. Likewise, the correction gains Kv_L2, Kv_L3 are set to be smaller than the correction gain Kv_L1.

That is, each target turning angle φL_Rt, φL_Lt by the traffic lane edge side control for the right departure and for the left departure is an angle to determine a control amount by which the lateral displacement deviation from each lateral displacement reference position LXR, LXL is decreased. And at this time, the control amount is corrected by the yaw angle θ of the vehicle C and the road curvature ρ. The yaw angle θ part of the vehicle C of the second term in the expressions functions as a feedback control amount for a lateral velocity. Thus, as the yaw angle θ part of the vehicle C of the second term, the yaw angle deviations ΔθR and ΔθL are not used, but the yaw angle θ is used.

From the above, as shown at an after-mentioned step S200, when calculating a final target turning angle φt, it is calculated as the sum of the target turning angle φL_Rt by the traffic lane edge side control for the right departure and the target turning angle φL_Lt by the traffic lane edge side control for the left departure. That is, the sum of the target turning angle φL_Rt and the target turning angle φL_Lt is the target turning angle of the traffic lane edge side control part.

At this time, in a case where the vehicle C is positioned in a zone between the left and right lateral displacement reference positions LXL, LXR which is the traffic lane center Ls side, as shown in FIG. 5, both values of the lateral displacement deviations ΔXR, ΔXL become 0. Therefore, values of the above target turning angle φL_Rt and the above target turning angle φL_Lt become small values. As a consequence, the target turning angle of the traffic lane edge side control part becomes small, and after-mentioned target turning angles φY_Lt, φY_Rt of a traffic lane center side control part become predominant.

Further, in a case where the vehicle C is positioned out of the zone between the left and right lateral displacement reference positions LXL, LXR which is the traffic lane center Ls side, as shown in FIG. 5, only one value of the lateral displacement deviations ΔXR, ΔXL becomes 0. Therefore, of the target turning angle φL_Rt and the target turning angle φL_Lt, one of the target turning angle φL_Lt and the target turning angle φL_Rt for the traffic lane edge side control, which is situated away from the vehicle C, becomes small. And the other of the target turning angle φL_Lt and the target turning angle φL_Rt for the traffic lane edge side control, which is situated near the vehicle C, becomes predominant as the target turning angle of the traffic lane edge side control part.

The yaw angle θ of the vehicle C with respect to the traffic lane L is provided in the second term as a differential term (the lateral velocity) with respect to the lateral displacement X, then the control is performed with this differential term fed beck as it is. Further, the third term is provided as the correction term for the road curvature ρ, then the feedback control is performed. As a result, by a first term, it is possible to keep the vehicle in the traffic lane L properly while avoiding movement in which the position of the vehicle C would be controlled to an outer side of the traffic lane L with the lateral displacement reference position being the reference. And by providing the second and third terms, it is possible to lessen rebounding feeling of the vehicle C from the traffic lane edge side Le. That is, as the convergence term, by providing the second term (a differential value of a lateral direction displacement) and the third term (the convergence term for the curve of the road), convergence on the lateral displacement reference position becomes better. Here, the rebounding feeling is represented as follows. Assuming that the traffic lane edge side Le is an imaginary wall, when the vehicle touches the traffic lane edge side Le, the vehicle strikes against this imaginary wall and receives a reaction force from the wall. This reaction force-receiving feeling is represented as the rebounding feeling. Further, if the rebounding feeling is defined technologically, when acceleration occurs to the vehicle by the control, an inertial force acts on an occupant or the driver by the acceleration. This inertial force is the rebounding feeling, and the driver feels this inertial force as the rebounding feeling. A direction of the acceleration, i.e. a direction of the inertial force acting on the occupant by the control, is mainly a yaw direction that is a direction in which the vehicle C rotates when viewed from above and a lateral direction that is a direction in which the vehicle C moves in a width direction of the traffic lane.

Further, by multiplying the first to third terms by the traffic lane edge side control feedback correction gains KρL_R, KρL_L, the control gain is corrected. That is, by performing the correction according to the direction of the curve of the traffic lane L, the curvature ρ and a lateral position, the control can be achieved properly without the awkward feeling even in the curve.

Here, it is also possible that the above third term is zero.

Subsequently, at step S190, on the basis of the following expression (9) and expression (10), a target turning angle φY_Rt by the traffic lane center side control for the right departure and a target turning angle φY_Lt by the traffic lane center side control for the left departure are calculated.

$$\phi Y\_Rt = -(Kc\_Y \times Kv\_Y \times Ky\_R \times K\rho Y\_R \times \Delta \theta R) \quad (9)$$

$$\phi Y\_Lt = -(Kc\_Y \times Kv\_Y \times Ky\_L \times K\rho Y\_L \times \Delta \theta L) \quad (10)$$

Here, Kc_Y is a feedback gain determined by the specifications of the vehicle. Kv_Y is a correction gain according to the vehicle speed. For instance, Kv_Y is set so that the higher the vehicle speed is, the larger the Kv_Y is.

Figure 9A:
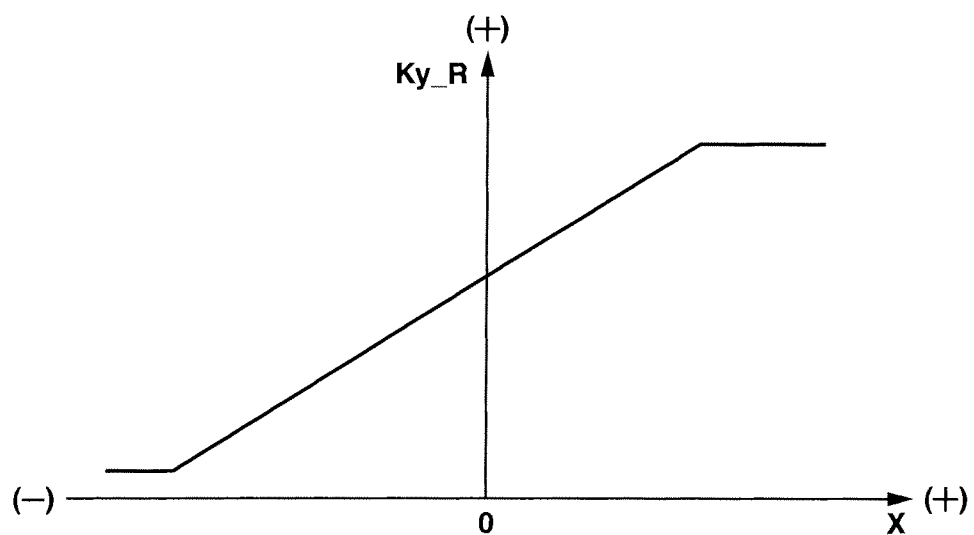
FIG. 9A is a conceptual drawing showing a state of a feedback gain $Ky\_R$.
Figure 9B:
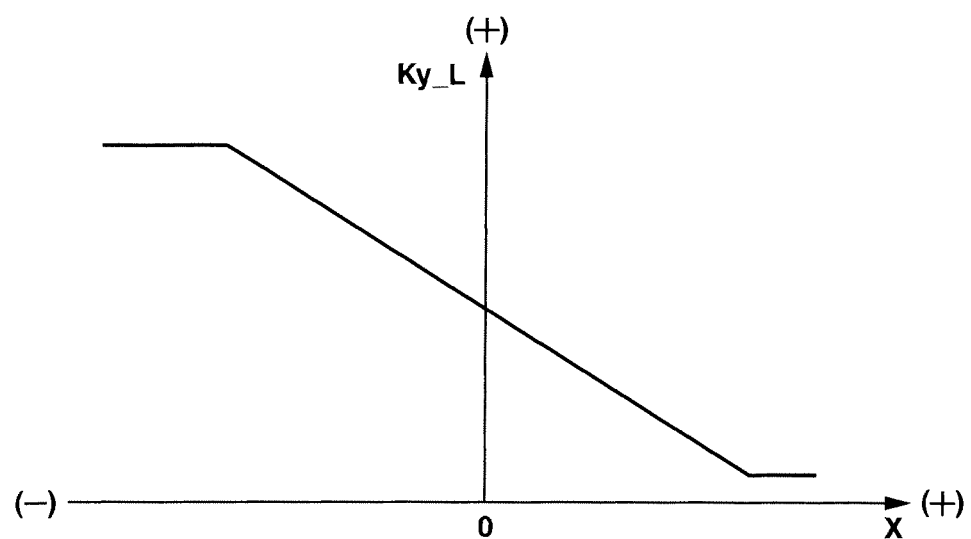
FIG. 9B is a conceptual drawing showing a state of a feedback gain $Ky\_L$.

Further, Ky_R, Ky_L are feedback gains that are separately set according to the lateral displacement X with respect to the traffic lane L, as shown in FIG. 9.

That is, the target turning angle φY_Rt by the traffic lane center side control for the right departure is for a case where the travelling direction of the vehicle C points to the right side. Thus, the feedback gain Ky_R for the right departure is set so that, as shown in FIG. 9, as the vehicle C approaches the right side traffic lane edge side Le closer with respect to the left side traffic lane edge side Le side, the feedback gain Ky_R becomes larger.

Furthermore, the target turning angle φY_Lt by the traffic lane center side control for the left departure is for a case where the travelling direction of the vehicle C points to the left side. Thus, the feedback gain Ky_L for the left departure is set so that, as shown in FIG. 9, as the vehicle C approaches the left side traffic lane edge side Le closer with respect to the right side traffic lane edge side Le side, the feedback gain Ky_L becomes larger. Regarding the target turning angle φY_Rt and φY_Lt, turning in the right direction is a positive, and turning in the left direction is a negative.

Here, as shown at the after-mentioned step S200, a final target turning angle of the traffic lane center side control part is calculated as the sum of the target turning angle φY_Rt by the traffic lane center side control for the right departure and the target turning angle φY_Lt by the traffic lane center side control for the left departure. At this time, in a case where the yaw angle θ to the right side is formed, as shown in FIG. 6B, since the ΔθL is 0, the target turning angle φY_Lt for the left departure becomes 0. Therefore, only the target turning angle φY_Rt for the right departure is employed. Likewise, in a case where the yaw angle θ to the left side is formed, as shown in FIG. 6A, since the ΔθR is 0, the target turning angle φY_Rt for the right departure becomes 0. Therefore, only the target turning angle φY_Lt for the left departure is employed.

At this time, as mentioned above, the control gains Ky_R, Ky_L are set so that, as shown in FIG. 9, the traffic lane edge side Le existing in the direction of the yaw angle θ of the vehicle C is set as a reference, and the closer the vehicle C approaches this traffic lane edge side Le, the larger the control gains Ky_R, Ky_L are. From this, in a case where the yaw angle θ occurs toward the departure side, the control is performed with a large control amount so as to actively prevent the departure. In addition, in a case where the yaw angle θ occurs toward a departure avoidance side, the control amount becomes small, then the travelling direction of the vehicle C can be fitted to a direction along the traffic lane L gently without the awkward feeling.

Further, the above control gains Ky_R, Ky_L are set so that, one traffic lane edge side Le is set as the reference, and the closer the vehicle C approaches this traffic lane edge side Le, the larger the control gains Ky_R, Ky_L are. With this, even when the vehicle C travels so as to cross or run on the traffic lane center Ls, the control amount is continuously varied, and thereby suppressing the awkward feeling when the vehicle crosses or runs on the traffic lane center Ls.

Furthermore, in a case where the displacement exists at the inside or the outside with respect to the traffic lane center Ls in the curve, as calculated at step S170, by performing the correction according to the direction of the curve of the traffic lane L and the curvature ρ, the control can be achieved properly without the awkward feeling even in the curve.

Subsequently, at step S200, the final target turning angle φt for the lane keeping assist is calculated.

In the present embodiment, as shown in the following expression (11), the final target turning angle φt is calculated as the sum of the left and right target turning angles φL_Lt, φL_Rt by the traffic lane edge side control calculated at step S180 and the left and right target turning angles φY_Lt, φY_Rt by the traffic lane center side control calculated at step S190.

$$\phi t = (\alpha\_R \times \phi L\_Rt + \beta\_R \times \phi Y\_Rt) + (\alpha\_L \times \phi L\_Lt + \beta\_L \times \phi Y\_Lt) \quad (11)$$

Here, α_R, β_R are weighting factors for the traffic lane edge side control and the traffic lane center side control, for the right departure, respectively. α_L, β_L are weighting factors for the traffic lane edge side control and the traffic lane center side control, for the left departure, respectively.

Figure 10A:
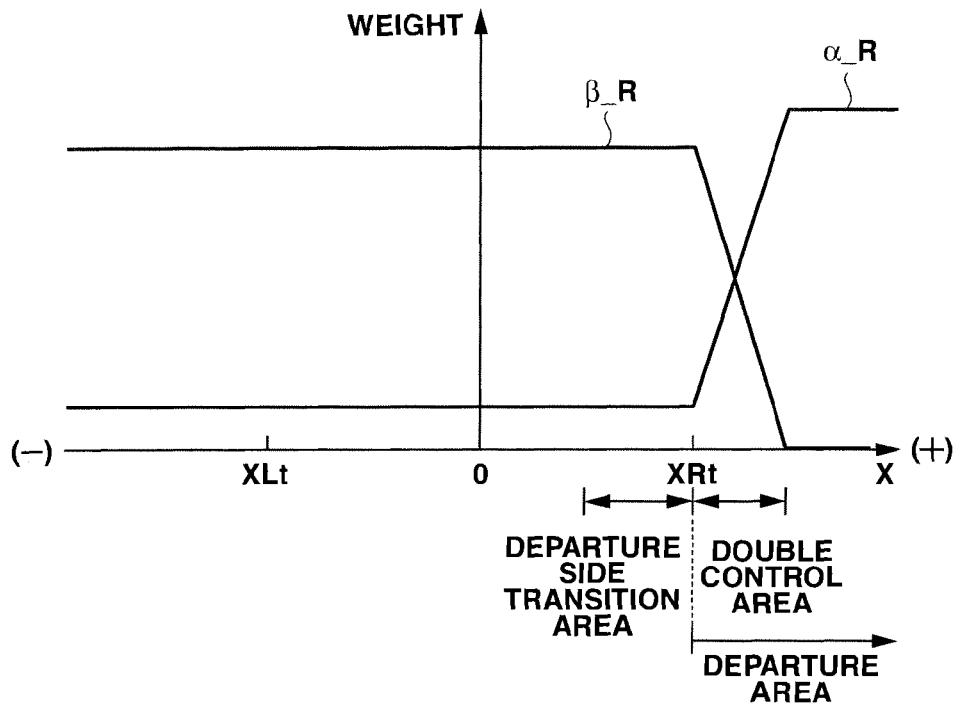
FIG. 10A is a drawing showing a lateral position and a value of a weighting factor.
Figure 10B:
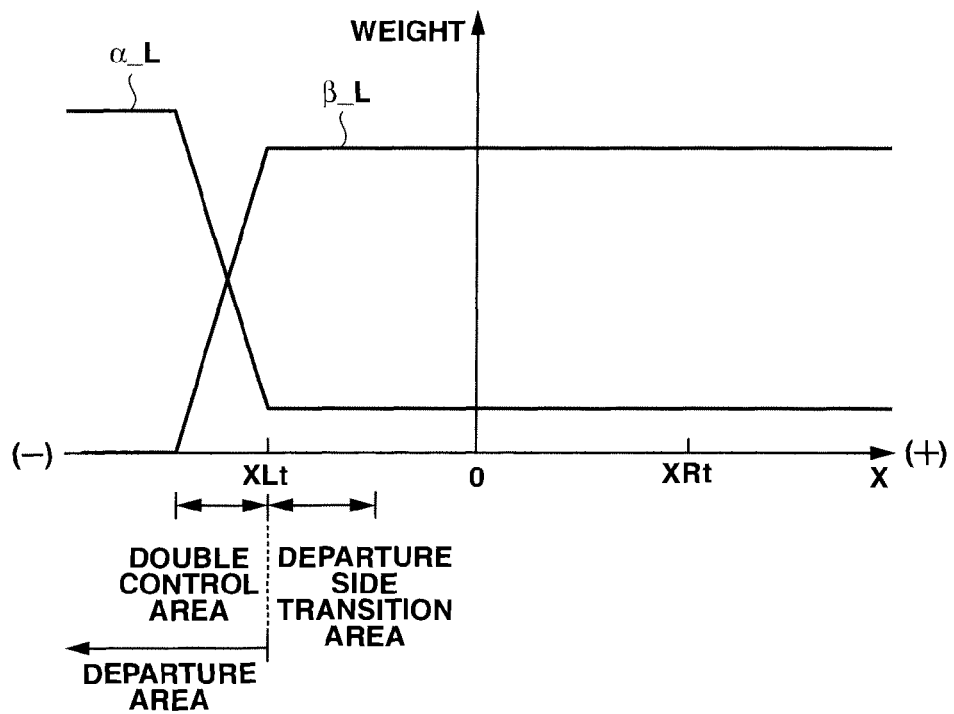
FIG. 10B is a drawing showing a lateral position and a value of a weighting factor.

Relationships between the weighting factors α_R, α_L, β_R, β_L are shown in FIGS. 10A and 10B, and magnitudes of β_R, β_L relative to α_R, α_L are changed according to the lateral position of the vehicle C.

Further, the relationships are expressed by the following expressions.

$$\alpha\_R + \beta\_R = 1.0$$

$$\alpha\_L + \beta\_L = 1.0$$

These weighting factors will be explained.

As expressed in the expression (7) and the expression (8), the feedback of a yaw angle element (the lateral velocity) is present as the second term of the target turning angles φL_Rt, φL_Lt by the traffic lane edge side control. This feedback is set as the differential term of a lateral displacement element to lessen the rebounding feeling from the traffic lane edge side Le. Thus, along with the feedback of the lateral displacement element, it becomes possible to improve convergence property on the lateral displacement reference position.

On the other hand, as expressed in the expression (9) and the expression (10), the feedback of a yaw angle θ element in the traffic lane center side control is set with the aim of fitting the travelling direction of the vehicle C to the traffic lane L.

Because of this, for example, in a case where the yaw angle θ to the left side (the departure side) is formed at the left edge side of the traffic lane L, if the yaw angle feedback in the traffic lane center side control is performed in addition to the lateral displacement feedback element in the traffic lane edge side control, there is a risk that an excess of control will occur. Further, in a case where the yaw angle θ to the right side (the departure avoidance side) is formed at the left edge side of the traffic lane L, the yaw angle feedback in the traffic lane center side control is set to be weak, then the convergence property on the lateral displacement reference position becomes worse, and there is a possibility that the rebounding feeling from the traffic lane edge side Le will occur.

For this reason, in the present invention, for instance, as shown in FIGS. 10A and 10B, the weight is set so that as the vehicle C approaches the traffic lane edge side Le side closer with respect to the lateral displacement reference threshold value, the weight of the traffic lane edge side control side becomes larger. On the other hand, the weight is set so that as the vehicle C approaches the traffic lane center Ls side closer, the weight of the traffic lane center side control side becomes larger. In this manner, these weights are set in accordance with the lateral position of the vehicle C with respect to the traffic lane L. By setting the weight in this manner, in the traffic lane center Ls, it is possible to realize a free chosen line without sense of restraint. Also, at the traffic lane edge side Le, it is possible to keep the vehicle in the traffic lane L properly and to lessen the rebounding feeling from the traffic lane edge side Le.

By setting the weights in the above manner, at the traffic lane edge side Le side with respect to the lateral displacement reference threshold value, there is a double control area in which both controls of the lateral displacement feedback and the yaw angle feedback are carried out.

Subsequently, at step S210, driver's intention to change the traffic lane is judged. More specifically, on the basis of the direction indicator switch signal obtained at step S100 and the travelling direction of the vehicle C, a judgment is made as to whether or not the driver changes the traffic lane L.

That is, when a direction (direction indicator light-on side) indicated by the direction indicator switch signal and the travelling direction of the vehicle C are the same direction, it is judged that the driver intends to change the traffic lane L. In this case, the process is reset without performing a correction of the turning angle at step S220. Here, it is also possible that, when the steering of the steering wheel 12 is the same direction as the direction (direction indicator light-on side) indicated by the direction indicator switch signal, it is judged that the driver intends to change the traffic lane L.

Subsequently, at step S220, a correction turning angle command value of the final target turning angle φt calculated at step S200 is outputted to the steering controller 11.

Here, as described above, when the steering controller 11 inputs the correction turning angle command value of the final target turning angle φt from the lane keeping assist controller 15, the steering controller 11 adds the final target turning angle φt to the target turning angle calculated according to the steering operation of the driver then sets this as a final target turning angle, and the steering controller 11 drives the turning actuator 5 so as to realize a turning angle according to this target turning angle.

Here, as the vehicle C in which the lane keeping assist device of the present invention is provided, the vehicle C employing the steer-by-wire system is exemplified. In a case of the vehicle C in which a power steering system using power or hydraulic pressure is mounted, it is also possible that, the final target turning angle φt is converted to a correction amount of an assist torque amount, and by adding this to an assist torque, the correction of the turning angle part is performed.

Further, in the vehicle C that is capable of changing the turning angle by rotating and changing the steering shaft, its rotating and changing amount could be corrected by an amount of the above final target turning angle φt.

Here, the left and right lateral displacement reference positions LXL, LXR form both of the lateral direction displacement threshold values and the lateral displacement reference positions. Steps S180, S190 form a control amount calculation means. Step S200 and the steering controller 11 form a travelling direction control means. The expression (4) and the expression (5) correspond to a configuration that sets the lateral displacement deviation to zero or decreases the control gain when positioned between the left and right lateral direction displacement threshold values. The expression (9) and the expression (10) form a second control amount calculation means, a third control amount calculation means and a fourth control amount calculation means, and their target turning angles φY_Rt, φY_Lt are a second control amount, a third control amount and a fourth control amount. The expression (7) and the expression (8) form a first control amount calculation means, and their target turning angles φL_Rt, φL_Lt are a first control amount. Further, the expression (11) forms a final control amount calculation means. Furthermore, the final target turning angle φt forms a final control amount. Moreover, the correction gains KρL_R, KρL_L, KρY_R, KρY_L form a curve road correction means. The left and right traffic lane edge sides Le form lateral edge side reference positions. The weighting factors β_R, β_L form a second weighting factor and a third weighting factor. The weighting factors α_R, α_L form a first weighting factor. The yaw angle deviation ΔθR or ΔθL forms an angle deviation. The second term in the expression (7) and the expression (8) forms a fifth control amount.

(Operation)
"Between the Left and Right Lateral Displacement Reference Positions LXL, LXR"

First, a case where the vehicle C travels between the left and right lateral displacement reference positions LXL, LXR will be explained.

In this case, ΔXR and ΔXL are both zero. Therefore, the first term of the right and left target turning angle φL_Rt, φL_Lt by the traffic lane edge side control, expressed in the expression (7) and the expression (8), becomes zero. That is, the right and left target turning angle φL_Rt, φL_Lt by the traffic lane edge side control become small values.

Here, the second term of the right and left target turning angle φL_Rt, φL_Lt by the traffic lane edge side control becomes a control amount with an amount of the lateral velocity of the vehicle C being zero. Further, when the road is the straight road, the second term of the right and left target turning angle φL_Rt, φL_Lt by the traffic lane edge side control takes a value of zero.

Further, in the case where the vehicle C travels between the left and right lateral displacement reference positions LXL, LXR, the weighting factors α_R, α_L for the right and left target turning angles φL_Rt, φL_Lt by the traffic lane edge side control are set to small values as shown in FIGS. 10A and 10B.

With this, in the case where the vehicle C travels between the left and right lateral displacement reference positions LXL, LXR, the target turning angles φY_Rt, φY_Lt by the traffic lane center side control become predominant. In particular, as shown in FIGS. 10A and 10B, the weighting factors are set so that the weighting factors β_R, β_L for the target turning angles φY_Rt, φY_Lt by the traffic lane center side control are greater than the weighting factors α_R, α_L for the right and left target turning angles φL_Rt, φL_Lt by the traffic lane edge side control. Also by this setting, in the case where the vehicle C travels between the left and right lateral displacement reference positions LXL, LXR, the target turning angles φY_Rt, φY_Lt by the traffic lane center side control become predominant.

Therefore, in the case where the vehicle C travels between the left and right lateral displacement reference positions LXL, LXR, the vehicle C is controlled so that the angle deviation decreases, and the vehicle C travels in a parallel direction to the traffic lane L along the driving line of driver's intention to drive.

From the above, in the case where the vehicle C is positioned at the traffic lane center Ls side, the control is performed so that the angle deviation decreases. And there is no feedback for the lateral direction displacement, or the feedback for the lateral direction displacement is small. That is, there is no control intervention that returns the vehicle C to the traffic lane center Ls side, or the control intervention that returns the vehicle C to the traffic lane center Ls side is small. As a consequence, the vehicle C travels along the traffic lane L according to the driving line of driver's intention to drive.

Further, at this time, when calculating the target turning angles φY_Rt, φY_Lt, as expressed in the expression (9) and the expression (10), the correction is performed by using Ky_R, Ky_L in the multiplication as the control gains. These control gains Ky_R, Ky_L are set so that, the closer the distance of the vehicle C gets to a driving direction edge of the travelling direction side of the vehicle C, the larger the control gains Ky_R, Ky_L are, then the target turning angles φY_Rt, φY_Lt become large values.

Thus, in a case where the travelling direction of the vehicle C is the departure side, the target turning angles φY_Rt, φY_Lt become large, and a departure prevention effect becomes great. Further, in a case where the travelling direction of the vehicle C is the departure avoidance side, the target turning angles φY_Rt, φY_Lt become small, and no excess of control occurs and the awkward feeling is lessened.

For example, in a case where the travelling direction of the vehicle C is such that the yaw angle θ to the right side with respect to the traffic lane L is formed, the more the vehicle C is displaced (the lateral displacement X) and positioned at the right side (the departure side) with respect to the traffic lane center Ls, the larger the target turning angle φY_Rt is. That is, a departure avoidance effect becomes great. On the other hand, the more the vehicle C is displaced (the lateral displacement X) and positioned at the left side (the departure avoidance side) with respect to the traffic lane center Ls, the smaller the target turning angle φY_Rt is.

Furthermore, the control gains Ky_R, Ky_L are changed according to a distance from the driving direction edge of the travelling direction side of the vehicle C. Therefore, in a case where the travelling direction of the vehicle C inclines to the right side with respect to the traffic lane L, i.e. the yaw angle θ to the right side is formed, even when the vehicle C travels so as to cross the traffic lane center Ls from the left side to the right side, this is less prone to give the awkward feeling to the driver.

"Shifting Period for which the Vehicle Enters the Outer Side with Respect to the Lateral Displacement Reference Positions LXL, LXR"

Next, a case where the vehicle C shifts to the outer side with respect to the left and right lateral displacement reference positions LXL, LXR from the traffic lane center Ls side will be explained.

Here, an area on the traffic lane edge side with respect to the lateral displacement reference positions LXL, LXR is called a departure area.

As described above, in the case where the vehicle C travels between the left and right lateral displacement reference positions LXL, LXR, the control is executed so that the angle deviation decreases. Therefore, this results in the yaw angle (the angle deviation) to the departure direction of the vehicle when the vehicle enters the departure area being kept small. That is to say, the control by the second control amount, which decreases the angle deviation to the departure side in the process of entering the departure area, acts as a preliminary control to reduce the first control amount that decreases the lateral displacement deviation.

"In the Case where the Vehicle is Positioned in the Departure Area"

Next, a case where the vehicle C is positioned at the outer side of the left and right lateral displacement reference positions LXL, LXR with respect to the traffic lane center Ls (a case where the vehicle C is positioned in the departure area) will be explained.

In this case, by the target turning angles φL_Rt, φL_Lt by the traffic lane edge side control, expressed by the expression (7) and expression (8), the control intervenes so that the deviation from the lateral displacement reference position that is a lateral displacement reference position closer to the vehicle C decreases. That is, the control that heads the vehicle in a direction of an inner side of the left and right lateral displacement reference positions LXL, LXR with respect to the traffic lane center Ls, i.e. the control that returns the vehicle to the traffic lane center Ls side, intervenes. With this, it is possible to keep the vehicle in the traffic lane L properly while avoiding movement in which the position of the vehicle C would be controlled to the outer side of the traffic lane L.

At this time, the control that decreases the angle deviation by the target turning angles φY_Rt, φY_Lt by the traffic lane center side control also intervenes.

Figure 11:
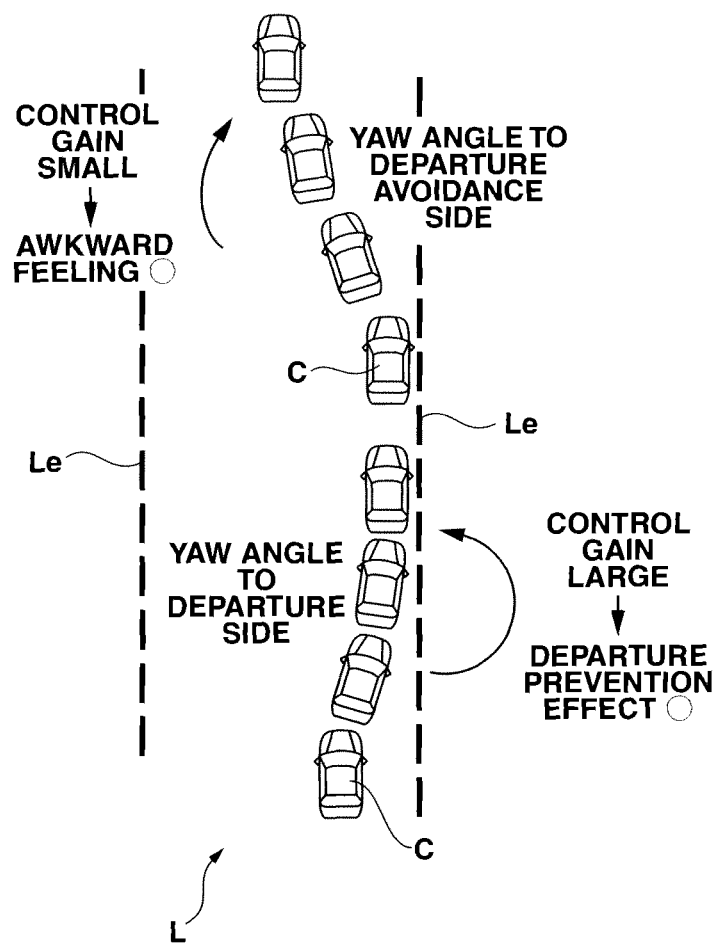
FIG. 11 is a drawing for explaining movement according to the first embodiment of the present invention.

Therefore, as shown in a lower part in FIG. 11, in a case where the angle deviation (the yaw angle θ) to the departure side (the edge side of the traffic lane L which is an edge side closer to the vehicle C) is formed, i.e. in a case where the vehicle C travels toward the departure side (the edge side of the traffic lane L which is an edge side closer to the vehicle C), a control amount that dissolves the angle deviation and also a control amount of a direction that dissolves the lateral direction displacement occur in the same direction. As a result, a control amount to the departure avoidance side becomes large, then the departure can be prevented more effectively. Further, since a turning radius of a trace line of the vehicle can be large, acceleration/deceleration of the yaw direction can be small, then this allows the rebounding feeling to be small more surely. And at this time, as described above, the control gains Ky_R, Ky_L of the yaw angle feedback are the large values. That is, since the control amount that dissolves the angle deviation becomes large, its effect is great.

Further, as shown in an upper part in FIG. 11, in a case where the angle deviation (the yaw angle θ) to the departure avoidance side (the direction moving away from the edge side of the traffic lane L which is the edge side closer to the vehicle C) is formed, i.e. in a case where the vehicle C travels toward the departure avoidance side (the direction moving away from the edge side of the traffic lane L which is the edge side closer to the vehicle C), by the control amount to the departure side which dissolves the angle deviation, the control amount of the direction that dissolves the lateral direction displacement is reduced or is dissolved. As a result, an awkward feeling which the driver feels as if the control to the departure side intervenes can be lessened. In addition, since the turning radius of the trace line of the vehicle can be large, acceleration/deceleration of the yaw direction can be small, then this allows the rebounding feeling to be small more surely.

And at this time, as described above, the control gains Ky_R, Ky_L of the yaw angle feedback are the small values. That is, since the control amount that dissolves the angle deviation becomes small, its effect of reducing the awkward feeling is great.

Further, as expressed in the expression (7) and the expression (8), regarding the target turning angles φL_Rt, φL_Lt by the traffic lane edge side control, by the control amount that decreases the lateral velocity in the second term and the control amount that takes account of the road curvature ρ in the third term, the convergence property on the direction along the lateral displacement reference position becomes better, it is therefore possible to lessen the rebounding feeling from the traffic lane edge side Le.

Further, by correcting the control amounts by the control feedback correction gains KρL_R, KρL_L, KρY_R, KρY_L, the target turning angle φt is different between the curve inside and the curve outside in the curve.

Figure 12:
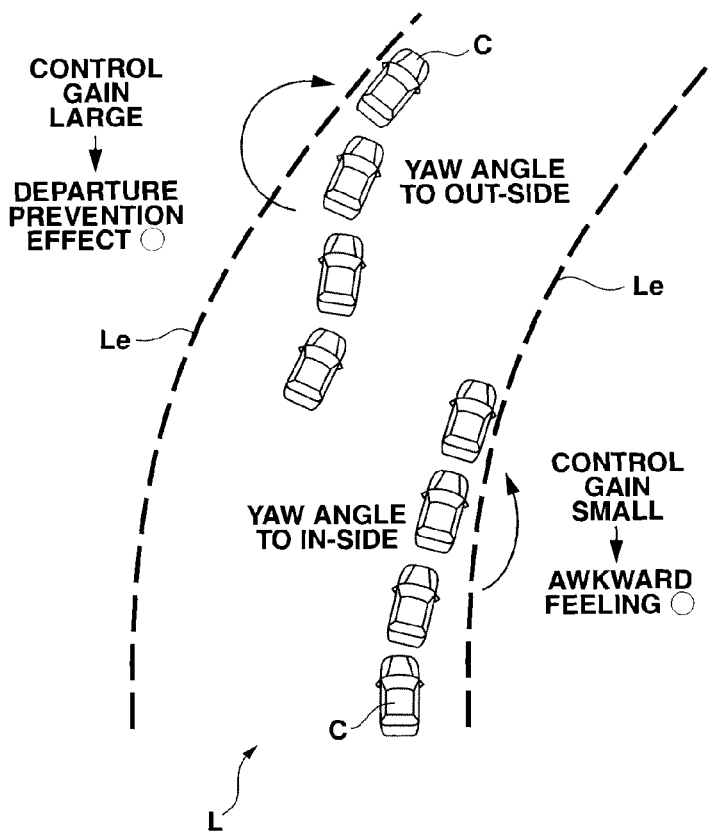
FIG. 12 is a drawing for explaining movement in a curve in a road according to the first embodiment of the present invention.

That is, as shown in a lower part in FIG. 12, in the case where the vehicle C is positioned at the curve inside with respect to the traffic lane center Ls, the larger the curvature of the traffic lane L is, i.e. the tighter the curve is, the smaller the control feedback correction gains KρL_R, KρL_L, KρY_R, KρY_L are. That is, the target turning angle is corrected and set to be small. With this, the excess of control is prevented and the awkward feeling of the driver is lessened.

On the other hand, as shown in an upper part in FIG. 12, in the case where the vehicle C is positioned at the curve outside with respect to the traffic lane center Ls, the larger the curvature of the traffic lane L is, i.e. the tighter the curve is, the larger the control feedback correction gains KρL_R, KρL_L, KρY_R, KρY_L are. That is, the target turning angle is corrected and set to be large. With this, the traffic lane departure avoidance effect becomes great.

Figure 13:
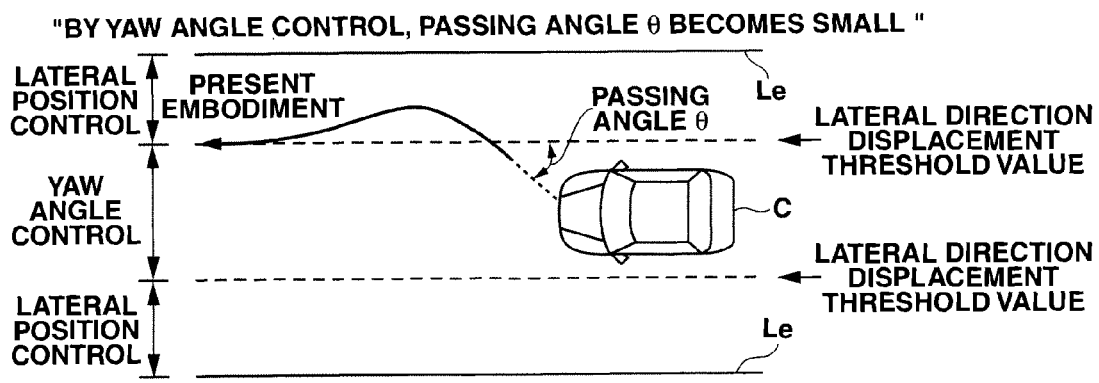
FIG. 13 is a conceptual drawing showing a trace line upon a departure according to the first embodiment of the present invention.

"Complex Function Upon the Departure Out of the Lateral Direction Displacement Threshold Value"A trace line of the vehicle upon the departure out of the lateral direction displacement threshold value is shown in FIG. 13.

As described above, by the yaw angle control, the yaw angle (a passing angle θ) to the departure direction of the vehicle C when the vehicle C enters the departure area can be small, namely that it is possible to decrease the passing angle θ that is an angle formed between the lateral direction displacement threshold value and the travelling direction of the vehicle C.

Because of this, a departure amount to the traffic lane edge side Le side with respect to the lateral direction displacement threshold value after the vehicle C enters the departure area becomes small. As a consequence, the control amount (a lateral position control) to decrease the lateral displacement deviation becomes small. Since this control amount is small, the rebounding feeling from the traffic lane edge side is diminished by this amount. The reason why the rebounding feeling is diminished is that since the control amount of the lateral position control is small, the turning radius of the trace line of the vehicle C becomes large and the acceleration/deceleration of the yaw direction can be small. And this gives rise to increase in a departure avoidance capability.

Further, in a scene where the vehicle C approaches the lateral direction displacement threshold value with the angle deviation of the vehicle C heading toward the departure avoidance direction, since the control amount that heads the vehicle C (the travelling direction of the vehicle C) toward the departure side by the yaw angle control is added, the turning radius of the trace line of the vehicle by the lateral position control becomes large and the acceleration/deceleration of the yaw direction can be small, then the rebounding feeling is diminished.

(Effect of the Present Embodiment)

(1) By the second control amount calculation means, the second control amount is calculated. That is, in the case where the vehicle C is positioned within the left and right lateral direction displacement threshold values, i.e. in the case where the vehicle C is positioned at the traffic lane center side with respect to the lateral direction displacement threshold value, the yaw angle feedback control, which is the control that decreases the angle deviation, is performed. With this, at the traffic lane center Ls side, the travelling direction of the vehicle is controlled in the direction along the traffic lane L. As a consequence, at the traffic lane center Ls side, the free chosen line without sense of restraint can be achieved.

(2) By the first control amount calculation means, the first control amount is calculated. That is, in the case where the vehicle C is positioned out of the left and right lateral direction displacement threshold values, i.e. in the case where the vehicle C is positioned at the traffic lane edge side with respect to the lateral direction displacement threshold value, a lateral position feedback control (the lateral position control), which is the control that decreases the lateral displacement deviation, is performed.

With this, when the vehicle C enters the departure area that is the area out of the lateral direction displacement threshold value, an effect of returning the vehicle within the lateral direction displacement threshold value is produced.

(3) At this time, as described above, since the yaw angle feedback control is performed by the second control amount in the case where the vehicle C is positioned within the left and right lateral direction displacement threshold values, the passing angle when the vehicle enters the departure area from the traffic lane center side across the lateral direction displacement threshold value can be kept small. With this, the yaw angle feedback control by the second control amount provides the effect as the preliminary control for the departure prevention.

That is, in the case where the passing angle is small, the departure amount to the outer side of the lateral direction displacement threshold value after the vehicle enters the departure area becomes small. Then, when the vehicle enters the departure area, the first control amount used for the feedback control that decreases the lateral displacement deviation becomes small.

As a result, the rebounding feeling from the traffic lane edge side can be diminished, namely that sense of restraint which the driver feels can be reduced.

(4) In at least a part of the area (in the double control area) in a range of the lane edge side with respect to the lateral direction displacement threshold value, the control is carried out on the basis of the both control amounts of the first control amount and the second control amount.

Therefore, if the vehicle C is positioned out of the right and left lateral direction displacement threshold values with respect to the traffic lane center Ls, the both feedback controls of the lateral displacement X and the yaw angle θ are performed. As a consequence, the lane keeping assist which keeps the vehicle C in the traffic lane L properly and lessens the rebounding feeling from the traffic lane edge side Le, at the traffic lane edge side Le side, can be performed.

That is, in the double control area on the lateral direction displacement threshold value side in the departure area, both of the control amount of the lateral position control and the control amount of the yaw angle control are used. As a synergistic effect using the both control amounts, the following effects are provided.

That is, in the case where the vehicle travels in the direction moving away from the lateral direction displacement threshold value in the departure area, the control amount of the lateral position control and the control amount of the yaw angle control are the control amounts of the same direction (the departure avoidance direction). As a result, the radius of the trace line of the vehicle can be large.

On the other hand, in the case where the vehicle runs toward the lateral direction displacement threshold value in the departure area, the control amount of the lateral position control and the control amount of the yaw angle control are the control amounts of an opposite direction. As a result, the trace line of the vehicle gets closer to the lateral direction displacement threshold value, namely that the radius of the trace line of the vehicle can be large.

In this manner, by adding the yaw angle control to the lateral position control, the turning radius of the vehicle for the departure avoidance can be large. This means that, acceleration/deceleration of the yaw direction can be small, then the rebounding feeling can be small more surely.

(5) The final target turning angle φt is calculated from the target turning angles φL_Rt, φL_Lt by the traffic lane edge side control and the target turning angles φY_Rt, φY_Lt by the traffic lane center side control. At this time, the first weighting factor and the second weighting factor (the third weighting factor, a fourth weighting factor) are changed according to the lateral displacement deviation, and are set so that the larger the lateral displacement deviation is, the larger the first weighting factor is as compared with the second weighting factor (the third weighting factor, the fourth weighting factor). That is, the weight is set so that as the vehicle gets closer to the traffic lane edge side Le side, the weight of the traffic lane edge side control becomes larger. On the other hand, the weight is set so that as the vehicle gets closer to the traffic lane center Ls side, the weight of the traffic lane center side control becomes larger. In this manner, these weights are set in accordance with the lateral position of the vehicle C with respect to the traffic lane L.

As a consequence, at the traffic lane center Ls side, the yaw angle feedback becomes predominant, and the free chosen line without sense of restraint is realized. On the other hand, at the traffic lane edge side Le side, the feedback control by the lateral displacement X becomes predominant, and it is possible to keep the vehicle in the traffic lane L properly and to lessen the rebounding feeling from the traffic lane edge side Le.

In particular, in the present embodiment, in the target turning angles φL_Rt, φL_Lt by the traffic lane edge side control, although the yaw angle feedback part as the convergence term (the second term) is present, it is possible to reduce the excess of control of the yaw angle feedback by the above weighting factor.

(6) The first control amount is corrected by a lateral displacement velocity. That is, in the target turning angles φL_Rt, φL_Lt by the traffic lane edge side control, as the second term of the control amount of the feedback control by the lateral displacement X, the control amount of the lateral displacement velocity is added.

As a result, the convergence property of the lateral displacement X on the lateral displacement reference position becomes better. With this, it is possible to further lessen the rebounding feeling from the traffic lane edge side Le.

In addition, also there is the effect of enlarging the turning radius of the vehicle when turning from the departure side to the departure avoidance direction.

(7) The control gain of the second control amount (the third control amount, the fourth control amount) by the traffic lane center side control is corrected by the distance of the vehicle C to the traffic lane edge side Le which is located at the travelling direction side of the vehicle C of the left and right traffic lane edge sides Le. Then the target turning angles φY_Rt, φY_Lt by the traffic lane center side control are determined.

That is, the control gain of the yaw angle feedback control is changed according to the lateral position of the vehicle with respect to the traffic lane L. At this time, the control gain is corrected so that the shorter the distance of the vehicle C to the traffic lane edge side Le is, the larger the control gain is.

For example, in the case where the yaw angle θ to the right side is formed, the control gain is set so that as the vehicle gets closer to the right side traffic lane edge side Le from the left side traffic lane edge side Le, the control gain becomes larger. In the case where the yaw angle θ to the left side is formed, the control gain is set so that as the vehicle gets closer to the left side traffic lane edge side Le from the right side traffic lane edge side Le, the control gain becomes larger.

As a result, even if the feedback control by the lateral displacement X is not carried out, by controlling the travelling direction (the yaw angle θ) of the vehicle, the lane keeping assist without the awkward feeling (the sense of restraint) caused by the difference from the driving line of driver's intention to drive can be performed.

Further, in the case where the yaw angle θ to the departure side is formed, the control gain (the control amount) is set to be large, then the departure prevention effect is secured. On the other hand, in the case where the yaw angle θ to the departure avoidance side is formed, the control gain (the control amount) is set to be small, then the awkward feeling such as the excess of control can be lessened too.

At this time, by setting the control gain (the control amount) of the case where the yaw angle θ to the departure avoidance side is formed to be small, even if the control gain (the control amount) of the case where the yaw angle θ to the departure side is formed is set to be large, oscillation (hunting) is less prone to occur, and the greater departure prevention effect can be obtained.

(8) In the target turning angles φL_Rt, φL_Lt by the traffic lane edge side control, as the third term of the control amount of the feedback control by the lateral displacement X, the control amount according to the curvature ρ of the traffic lane L is added.

As a result, even in the case where the traffic lane L is the curve road, the convergence property of the lateral displacement X on the lateral displacement reference position becomes better.

(9) The curve road correction means is provided.

In a case where the curvature ρ of the traffic lane L is a certain value or more, i.e. in the case where the traffic lane L is the curve road, the correction is performed by the different control gains between the curve inside and the curve outside with respect to the width direction center. That is, in the case where the vehicle C is positioned at the curve inside of the traffic lane L with respect to the width direction center of the traffic lane L, when the curvature is large, the control gain is corrected and set to be small, as compared with the small curvature. On the other hand, in the case where the vehicle C is positioned at the curve outside of the traffic lane L with respect to the width direction center of the traffic lane L, when the curvature is large, the control gain is corrected and set to be large, as compared with the small curvature.

As a consequence, the excess of control at the curve inside can be prevented. That is, the awkward feeling which the occupant feels as if the occupant is flicked away to the curve outside, which arises when the control amount is large, can be lessened.

Further, an insufficient control at the curve outside can be prevented. That is, the control intervention when the yaw angle θ to the curve outside occurs becomes strong, and the departure prevention effect becomes great.

(10) The first control amount calculation means calculating the first control amount that decreases the lateral displacement deviation, and the third control amount calculation means calculating the third control amount that decreases the angle deviation of the travelling direction of the vehicle with respect to the traffic lane when the vehicle passes across the lateral direction displacement threshold value from the traffic lane center side, are provided.

By this third control amount calculation means, it is possible to decrease the passing angle when the vehicle enters the departure area that is the area out of the lateral direction displacement threshold value.

Since the yaw angle feedback control based on this third control amount is performed, the passing angle when the vehicle enters the departure area from the traffic lane center side across the lateral direction displacement threshold value can be kept small. With this, the yaw angle feedback control by the second control amount provides the effect as the preliminary control for the departure prevention.

That is, in the case where the passing angle is small, the departure amount to the outer side of the lateral direction displacement threshold value after the vehicle enters the departure area becomes small. Then, when the vehicle enters the departure area, the first control amount used for the feedback control that decreases the lateral displacement deviation becomes small.

As a result, the rebounding feeling from the traffic lane edge side can be diminished, and the awkward feeling which the driver feels as if the control to the departure side intervenes can be lessened. That is, the sense of restraint which the driver feels can be reduced.

(11) In a case where the vehicle C is positioned in a departure side transition area on the traffic lane center side with respect to the lateral direction displacement threshold value, the third control amount calculation means calculates the control amount that decrease the above angle deviation of the travelling direction of the vehicle.

By performing the yaw feedback by the control amount that decrease the above angle deviation of the travelling direction of the vehicle, as the vehicle travels so as to get closer to the lateral direction displacement threshold value from the traffic lane center side, the angle deviation (the departure direction) of the travelling direction of the vehicle becomes smaller. As a consequence, the passing angle when the vehicle enters the departure area from the traffic lane center side across the lateral direction displacement threshold value can be kept small.

(12) At this time, in at least a part of the area (in the double control area) in the range of the lane edge side with respect to the lateral direction displacement threshold value, the control is carried out on the basis of the both control amounts of the first control amount and the second control amount.

Therefore, if the vehicle C is positioned out of the right and left lateral direction displacement threshold values with respect to the traffic lane center Ls, the both feedback controls of the lateral displacement X and the yaw angle θ are performed. As a consequence, the lane keeping assist which keeps the vehicle C in the traffic lane L properly and lessens the rebounding feeling from the traffic lane edge side Le, at the traffic lane edge side Le side, can be performed.

That is, in the double control area on the lateral direction displacement threshold value side in the departure area, both of the control amount of the lateral position control and the control amount of the yaw angle control are used. As a synergistic effect using the both control amounts, the following effects are provided.

That is, in the case where the vehicle travels in the direction moving away from the lateral direction displacement threshold value in the departure area, the control amount of the lateral position control and the control amount of the yaw angle control are the control amounts of the same direction (the departure avoidance direction). As a result, the radius of the trace line of the vehicle can be large.

On the other hand, in the case where the vehicle runs toward the lateral direction displacement threshold value in the departure area, the control amount of the lateral position control and the control amount of the yaw angle control are the control amounts of the opposite direction. As a result, the trace line of the vehicle gets closer to the lateral direction displacement threshold value, namely that the radius of the trace line of the vehicle can be large.

In this manner, by adding the yaw angle control to the lateral position control, the turning radius of the vehicle for the departure avoidance can be large. This means that, acceleration/deceleration of the yaw direction can be small, then the rebounding feeling can be small more surely.

(13) With regard to the control gain for the above angle deviation, the gain of the lane center side is larger than that of the lane edge side.

With this, while preventing the excess of the control amount of the yaw angle control in the departure area, at the traffic lane center Ls side, the travelling direction of the vehicle is controlled in the direction along the traffic lane L.

(14) The first control amount calculation means calculating the first control amount that decreases the lateral displacement deviation of the vehicle from the above lateral direction displacement threshold value, and the fourth control amount calculation means calculating the fourth control amount for the correction by which the trace line of the vehicle in the process of getting closer to the lateral direction displacement threshold value from the traffic lane center side is set in the direction that decreases the angle of the travelling direction of the vehicle with respect to the traffic lane, are provided.

By the fourth control amount calculation means, the trace line of the vehicle in the process of getting closer to the lateral direction displacement threshold value from the traffic lane center side is corrected in the direction in which the angle of the travelling direction of the vehicle with respect to the traffic lane becomes small. As a consequence, it is possible to decrease the passing angle when the vehicle enters the departure area that is the area out of the lateral direction displacement threshold value.

In the case where the passing angle is small, the departure amount to the outer side of the lateral direction displacement threshold value after the vehicle enters the departure area becomes small. Then, when the vehicle enters the departure area, the first control amount used for the feedback control that decreases the lateral displacement deviation becomes small.

As a result, the rebounding feeling from the traffic lane edge side can be diminished, and the awkward feeling which the driver feels as if the control to the departure side intervenes can be lessened. That is, the sense of restraint which the driver feels can be reduced.

(15) The fifth control amount that corrects the trace line of the vehicle by the first control amount in the direction that decreases the angle of the travelling direction of the vehicle with respect to the traffic lane when approaching the lateral direction displacement threshold value, is calculated.

With this, when the vehicle approaches the lateral direction displacement threshold value toward the departure avoidance direction in the departure area, the turning radius of the vehicle for the departure avoidance can be large. This results in acceleration/deceleration of the yaw direction being small, and the rebounding feeling can be small more surely.

(16) The fourth control amount calculation means calculates the control amount that decrease the angle deviation of the travelling direction of the vehicle with respect to the traffic lane in the case where the vehicle is positioned in the departure side transition area.

With this, it is possible to calculate the control amount by which the trace line of the vehicle in the process of getting closer to the lateral direction displacement threshold value from the traffic lane center side is set in the direction that decreases the angle of the travelling direction of the vehicle with respect to the traffic lane.

(Modification)

Figure 14:
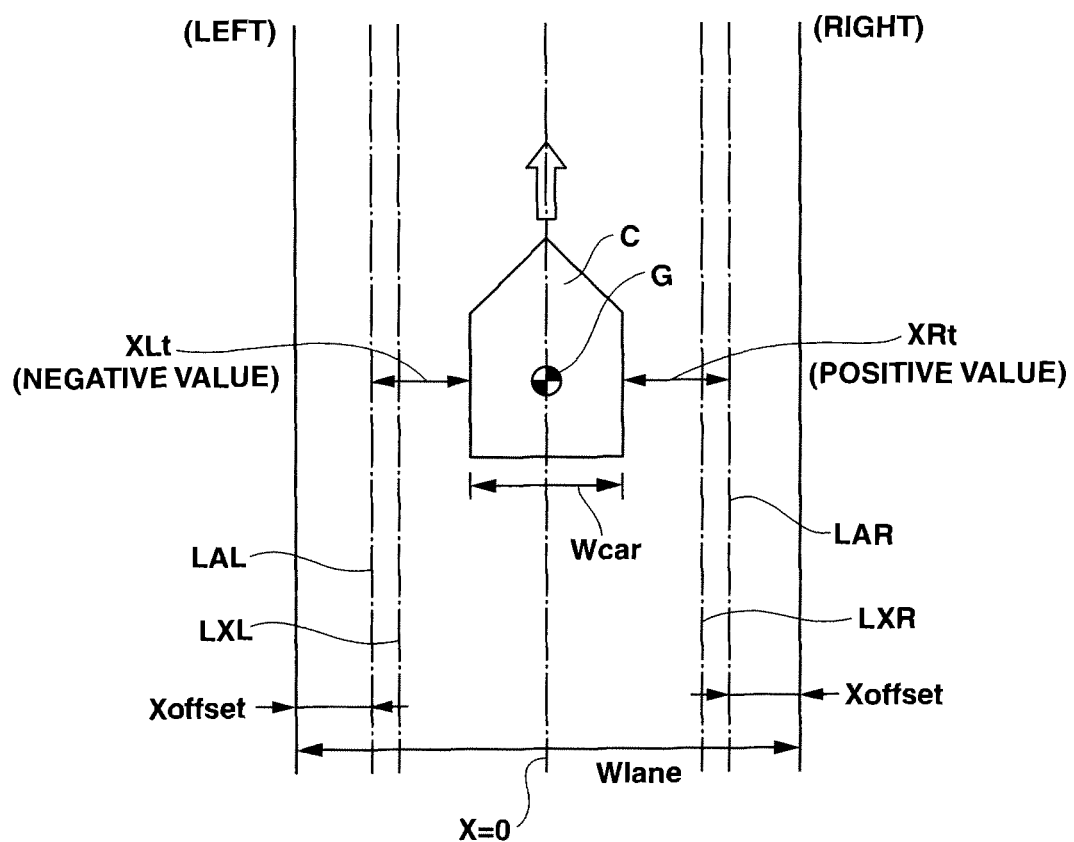
FIG. 14 is a top view for explaining a relationship between values according to a modification of the first embodiment of the present invention.

(1) In the above embodiment, the case where the lateral direction displacement threshold value and the lateral displacement reference position are identical is exemplified. As shown in FIG. 14, the lateral displacement reference positions LXL, LXR could be set on an inner side of lateral direction displacement threshold values LAL, LAR.

In this case, when the vehicle C is positioned at an outer side of the lateral direction displacement threshold value with respect to the traffic lane center Ls, the feedback control is performed so as to decrease the lateral displacement X toward the lateral displacement reference positions LXL, LXR that are positioned on the inner side of the lateral direction displacement threshold values LAL, LAR.

It becomes possible to control the control gain of a lateral direction feedback control.

(2) Further, in the case where the lateral displacement reference positions LXL, LXR are set on the inner side of the lateral direction displacement threshold values LAL, LAR, also when the vehicle C is positioned between the lateral displacement reference position LXL, LXR and the lateral direction displacement threshold value LAL, LAR, the feedback control could be performed so as to decrease the lateral displacement X. However, the control gain is set to be small as compared with the case where the vehicle C is positioned at the outer side of the lateral direction displacement threshold values LAL, LAR.

(3) In the above embodiment, the traffic lane edge side Le is a lateral direction edge position. Instead of this, the lateral direction edge position could be set on an inner side of the traffic lane edge side Le by a certain amount. For instance, the lateral direction edge position could be the same as the above lateral displacement reference positions LXL, LXR.

(4) In the above embodiment, the relationships between the weighting factors $\alpha\_R$, $\alpha\_L$, $\beta\_R$, $\beta\_L$ are set as shown in FIGS. 10A and 10B, and the magnitudes of $\beta\_R$, $\beta\_L$ relative to $\alpha\_R$, $\alpha\_L$ are changed according to the lateral position of the vehicle C.

The relationships between the weighting factors $\alpha\_R$, $\alpha\_L$, $\beta\_R$, $\beta\_L$ are not limited to this.

For example, $$\alpha\_R:\beta\_R=1:1$$

$$\alpha\_L:\beta\_L=1:1$$

as shown above, the relationships between the weighting factors could be set to be constant. It has been ascertained that even if the relationships are set in this manner, the effects can be obtained.

(5) A zone between a position that is offset to the lane center side from the lateral direction displacement threshold value and this lateral direction displacement threshold value is set as the departure side transition area. Then, in an area on the lane center side with respect to the departure side transition area, the second control amount is set to zero.

Figure 15A:
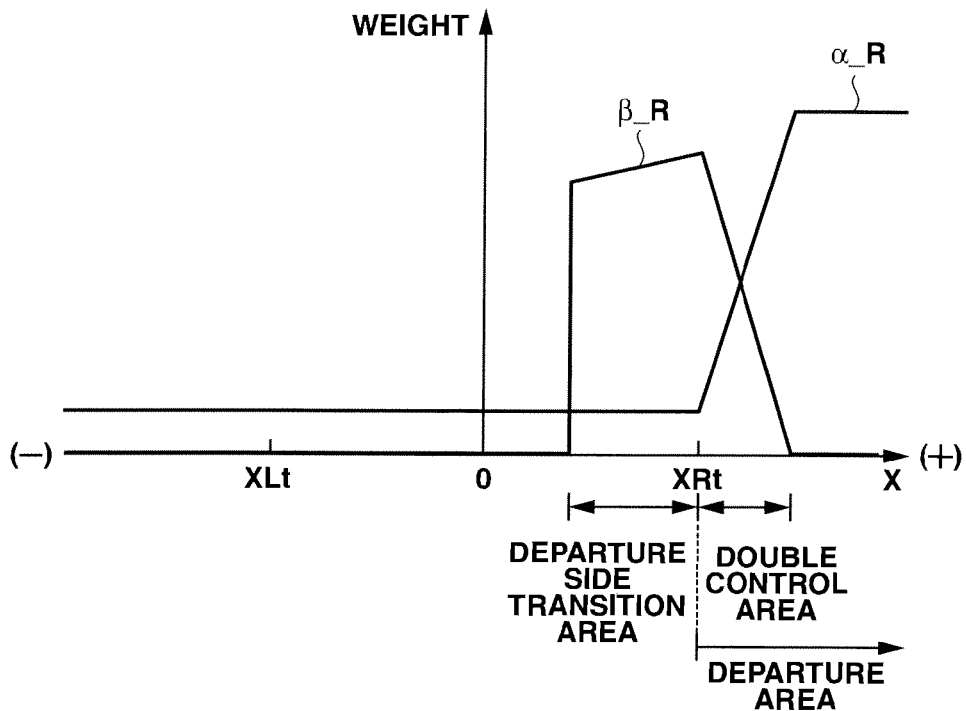
FIG. 15A is a drawing showing a weighting factor of a departure side transition area according to the first embodiment of the present invention.
Figure 15B:
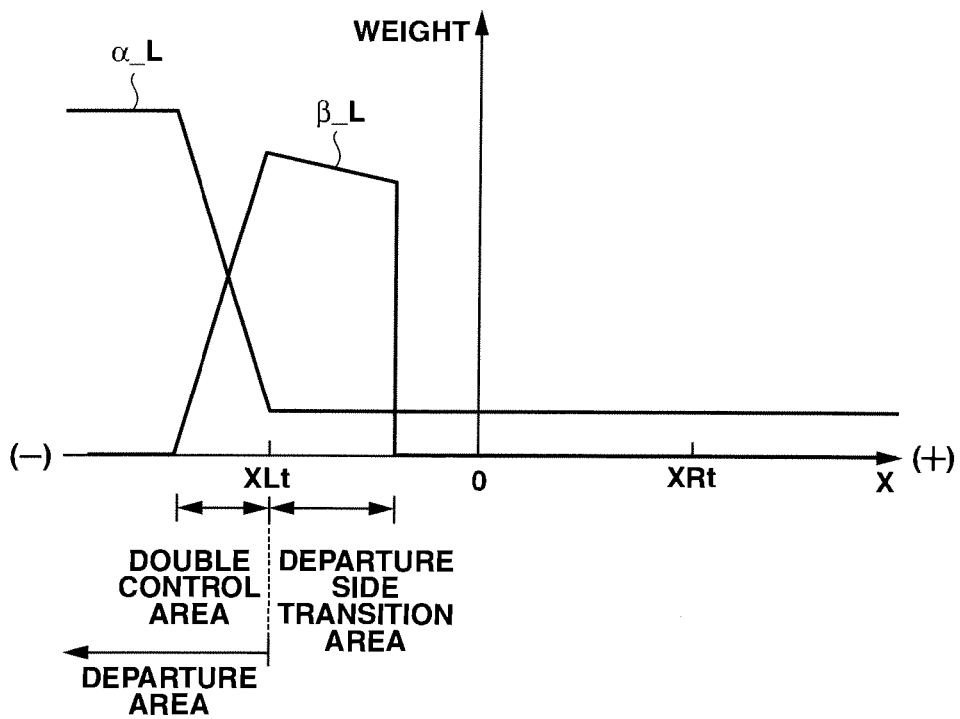
FIG. 15B is a drawing showing a weighting factor of a departure side transition area according to the first embodiment of the present invention.

For example, as shown in FIGS. 15A and 15B, with regard to the weighting factors $\beta\_R$, $\beta\_L$, they are set to zero in the area on the lane center side with respect to the departure side transition area.

As a result, it becomes possible to further reduce the sense of restraint in the area on the lane center side with respect to the departure side transition area.

(6) A zone between a position that is offset to the lane center side from the lateral direction displacement threshold value and this lateral direction displacement threshold value is set as the departure side transition area. Then, in an area on the lane center side with respect to the departure side transition area, the third control amount is set to zero.

For example, as shown in FIGS. 15A and 15B, with regard to the weighting factors $\beta\_R$, $\beta\_L$, they are set to zero in the area on the lane center side with respect to the departure side transition area.

As a result, it becomes possible to further reduce the sense of restraint in the area on the lane center side with respect to the departure side transition area.

(7) In the departure side transition area, with regard to the control gain for the angle deviation, the gain of the lane center side is set to be larger than that of the lane edge side. Further, with regard to the control gain for the lateral direction displacement deviation, the gain of the lane center side is set to be smaller than that of the lane edge side.

For example, as shown in FIGS. 15A and 15B, with regard to the weighting factors $\beta\_R$, $\beta\_L$, in the departure side transition area, they are set so that the closer the vehicle C approaches the lateral direction displacement threshold values XRt, XLt, the larger the weighting factors $\beta\_R$, $\beta\_L$ are.

With this, an effect by which the closer the vehicle C approaches the lateral direction displacement threshold values XRt, XLt, the smaller the angle deviation to the departure direction is set to be, is produced. As a consequence, the passing angle when the vehicle enters the departure area from the traffic lane center side across the lateral direction displacement threshold value can be kept small.

(8) In the above embodiment, the case where the travelling direction of the vehicle is controlled by correcting the turning angle or turning torque of the road wheel on the basis of the control amount is exemplified. Instead of correcting the turning angle or the turning torque, braking/driving amount or braking/driving force could be corrected on the basis of the control amount. In this case, each control amount is calculated by an amount of yaw moment which is an amount that decreases the lateral displacement deviation or decreases the angle deviation. Then, each braking/driving force is corrected so as to generate the yaw moment that corresponds to the control amount.

(9) With regard to the lateral direction displacement threshold value, only one lateral direction displacement threshold value could be set in the left or right width direction. Or only one of the left and right lateral direction displacement threshold values could be set at the traffic lane edge position.

(10) Steered road wheels could be the rear road wheels or both front and rear road wheels.

Second Embodiment

Next, a second embodiment will be explained with reference to the drawings. Here, the same component as the first embodiment will be explained using the same reference sign.

(Configuration)

A basic configuration of the present embodiment is similar to the above first embodiment. However, the process at step S200 in the lane keeping assist controller 15 is different.

The other configuration is the same as the above first embodiment.

The process at step S200 in the second embodiment will be explained.

This step S200 is an operation part that calculates the final target turning angle $\phi t$. In the first embodiment, the final target turning angle $\phi t$ is calculated by the sum of the left and right target turning angle $\phi L\_Lt$, $\phi L\_Rt$ by the traffic lane edge side control calculated at step S180 and the left and right target turning angles by the traffic lane center side control calculated at step S190 with the weight added to each target turning angle.

In contrast, in the present embodiment, by selectively using the left and right target turning angle by the traffic lane edge side control calculated at step S180 and the left and right target turning angles by the traffic lane center side control calculated at step S190, $\phi tL$, $\phi tR$ are calculated, then by calculating the sum of them, the final target turning angle $\phi t$ is calculated.

Next, an example of its operation will be explained.

First, the control amount for each of the left and right sides is selectively calculated.

That is, φL_Rt and φY_Rt, which are the right side control amounts, are compared, then the control amount of the greater value is set as φtR. That is, by selecting the greater one from φL_Rt and φY_Rt, i.e. by performing "select-high", the greater one is set as φtR.

Likewise, φL_Lt and φY_Lt, which are the left side control amounts, are compared, then the control amount of the greater value is set as 0 μL. That is, by selecting the greater one from 0 L_Lt and φY_Lt, i.e. by performing "select-high", the greater one is set as φtL.

Then, by the following expression, the final target turning angle φt is calculated.

$$\phi t = \phi t R + \phi t L$$

(Function and Operation)

If the lateral position feedback control amount and the yaw angle feedback control amount are merely added when calculating the final target turning angle φt, in a case where a large yaw angle θ is formed etc., there is a problem that the control amount might become excessive at the edge side of the traffic lane L. In order to solve this problem, such method that the control gains are uniformly lowered could be employed. However, if the control gain of the yaw angle feedback is lowered, control performance in the traffic lane center Ls is degraded. Also, if the control gain of the lateral position feedback is lowered, control performance at the traffic lane edge side Le is degraded.

For this reason, in the first embodiment, the weight is added to the lateral position feedback control amount and the yaw angle feedback control amount, and the weight is changed according to the lateral position.

Instead of this, the present embodiment performs the control using the select-high.

That is, the select-high of the right side control amount (the target turning angle φL_Rt, the target turning angle φY_Rt) is carried out. Likewise, the select-high of the left side control amount (the target turning angle φL_Lt, the target turning angle φY_Lt) is carried out. Subsequently, by calculating the sum of the left and right control amounts, the final target turning angle φt is calculated.

With this, in the case where the vehicle C is positioned within the left and right lateral direction displacement threshold values LAL, LAR, normally, according to the direction of the yaw angle θ, the final target turning angle φt becomes either value of the target turning angle φY_Rt or the target turning angle φY_Lt by the traffic lane center side control. As a result, in the case where the vehicle C is positioned at the traffic lane center Ls side, the yaw angle feedback control is performed.

In the following explanation, as an example, a case where the vehicle C is positioned out of the right side lateral direction displacement threshold value LAR will be explained.

First, a case where the direction of the travelling direction of the vehicle C is the departure side (the right side) will be explained.

At this time, the right side control amount is the following.

That is, the target turning angle φL_Rt by the traffic lane edge side control which is the lateral position feedback control amount and the target turning angle φY_Rt by the traffic lane center side control which is the yaw angle feedback control amount are compared. Then, on the basis of the yaw angle θ and the lateral displacement X amount, if the target turning angle φL_Rt by the traffic lane edge side control is greater, φtR is the target turning angle φL_Rt, while if the target turning angle φY_Rt by the traffic lane center side control is greater, φtR is the target turning angle φY_Rt.

On the other hand, the left side control amount is the following.

Since ΔθL is zero, the target turning angle φY_Lt by the traffic lane center side control becomes zero. Further, since ΔXL is also zero, on the basis of the expression (8), the first term of the expression (8) becomes zero. Because of this, although φtL becomes the target turning angle φL_Lt by the traffic lane edge side control, it is a small value.

Accordingly, as the final target turning angle φt, φtR of the greater value of the right side control amounts becomes a predominant control amount.

With this, it is possible to prevent the control amount at the traffic lane edge side Le side from being excessive.

Next, a case where the direction of the travelling direction of the vehicle C is the departure avoidance side (the left side) will be explained.

At this time, the right side control amount is the following.

That is, the target turning angle φY_Rt by the traffic lane center Ls side control which is the yaw angle feedback control amount is zero. Because of this, the target turning angle φL_Rt by the traffic lane edge Le side control which is the lateral position feedback control amount is φtR.

On the other hand, the left side control amount is the following.

Since ΔXL is also zero, on the basis of the expression (8), the first term of the expression (8) becomes zero. Because of this, although φtL becomes the target turning angle φY_Lt by the traffic lane center Ls side control, it is a small value.

Thus, if ΔθL, which is the yaw angle θ to the left side, is a certain amount or more, the target turning angle φY_Lt by the traffic lane center side control is φtL. And if ΔθL, which is the yaw angle θ to the left side, is small, φtL is a small value.

Consequently, the final target turning angle φt can lessen the rebounding feeling from the right side traffic lane edge side Le.

(Effect of the Present Embodiment)

(1) Of the first control amount and the second control amount (the third control amount, the fourth control amount), the greater value is set as the final control amount.

That is, after performing the select-high of the lateral position feedback control amount and the yaw angle feedback control amount for the left and right sides separately, by calculating the sum of the left and right control amounts, the final target turning angle φt is calculated.

As a consequence, the control performance at the traffic lane center Ls side can be secured, and the control performance at the traffic lane edge side Le side can be secured, while preventing the control amount of the final target turning angle φ from being excessive.

(2) The other effects are the same as the above first embodiment.

(Modification)

(1) A following threshold value operation could be added to the above selection-addition operation that performs the select-high for the left and right sides separately.

That is, when performing the select-high for the right side control amount, $$\text{if } \phi L\_Rt > \phi Y\_Rt,$$

$$\phi tR = L\_Rt, \text{ as described above.}$$

At this time, if φY_Rt>φth_Y, i.e. in a case where the target turning angle φY_Rt by the traffic lane center side control is greater than a predetermined threshold value, a correction is performed as follows.

$$\phi tR = \phi tR + K1 \times (\phi Y\_Rt - \phi th\_Y)$$

Conversely, if $\phi L\_Rt \leq \phi Y\_Rt$, $\phi tR = \phi Y\_Rt$, as described above.

At this time, if $\phi L\_Rt > \phi th\_L$, i.e. in a case where the target turning angle $\phi L\_Rt$ by the traffic lane edge side control is greater than a predetermined threshold value, a correction is performed as follows.

$$\phi tR = \phi tR + K2 \times (\phi L\_Rt - \phi th\_L)$$

Likewise, when performing the select-high for the left side control amount, if $\phi L\_Lt > \phi Y\_Lt$, $\phi tL = \phi L\_Lt$, as described above.

At this time, if $\phi Y\_Lt < -\phi th\_Y$, i.e. in a case where the target turning angle $\phi Y\_Lt$ by the traffic lane center side control is smaller than a predetermined threshold value, a correction is performed as follows.

$$\phi tL = \phi tL + K3 \times (\phi Y\_Lt + \phi th\_Y)$$

Conversely, if $\phi L\_Lt \leq \phi Y\_Lt$, $\phi tL = \beta\_L \times \phi Y\_Lt$, as described above.

At this time, if $\phi L\_Lt < -\phi th\_L$, i.e. in a case where the target turning angle $\phi L\_Lt$ by the traffic lane edge side control is smaller than a predetermined threshold value, a correction is performed as follows.

$$\phi tL = \phi tL + K4 \times (\phi L\_Lt + \phi th\_L)$$

Then, by the following expression, the final target turning angle $\phi t$ is calculated.

$$\phi t = \phi tR + \phi tL$$

In this manner, in a case where a select-low side of the left and right sides is greater than a predetermined amount, the correction by this amount is performs.

By such a way, also in the case where a large lateral displacement X and a large yaw angle θ are formed at the traffic lane edge side Le side, the control performance can be secured without setting the control amount of the final target turning angle φ to be too large.

(2) Further, it is also possible that, besides performing a multiplication by each weighting factor in some operations, each control amount which is the greatest is selected, and these control amounts are set as the left direction control amount and the right direction control amount, then by calculating the sum of them, a lane keeping control amount is obtained. By such a way, by adjusting ease of selection of each control amount in accordance with travelling condition, road information, etc., it becomes possible to execute an appropriate control for the travelling scene.

An example of its operation will be explained next.

When comparing and selecting the control amount, by using a gain γ_yaw and a gain γ_lat which are determined from information of the travelling vehicle C such as the yaw angle θ, the lateral position, the curvature and navigation information and the road information, the weight is added to the selection amount.

Here, γ_yaw is a gain that becomes large in a scene where the yaw angle θ is formed, thereby increasing a departure risk, such as in a case where the yaw angle θ by which the vehicle departs toward the curve outside is formed. γ_lat is a gain that becomes large in a scene where the vehicle is travelling on the current lateral position, thereby increasing a departure risk, such as in a case where the vehicle is travelling on the curve outside with the yaw angle θ.

Then, if $\gamma\_lat \times \phi L\_Rt > \gamma\_yaw \times \phi Y\_Rt$, $\phi tR = \phi L\_Rt$.

On the other hand, if $\gamma\_lat \times \phi L\_Rt \leq \gamma\_yaw \times \phi Y\_Rt$, $\phi tR = \phi Y\_Rt$.

Likewise, if $\gamma\_lat \times \phi L\_Lt > \gamma\_yaw \times \phi Y\_Lt$, $\phi tL = \phi L\_Lt$.

On the other hand, if $\gamma\_lat \times \phi L\_Lt \leq \gamma\_yaw \times \phi Y\_Lt$, $\phi tL = \phi Y\_Lt$.

Then, by the following expression, the final target turning angle $\phi t$ is calculated.

$$\phi t = \phi tR + \phi tL$$

(3) Furthermore, it is also possible that, the curve is judged from the curvature of the traffic lane L, and the control amount for the control from the curve outside to the inside is set by adding each operation amount, also the control amount for the control from the curve inside to the outside is set by selecting and using the greatest control amount, then by calculating the sum of them, a lane keeping control amount is obtained.

With this, the control amount for the departure to the curve outside is set by adding each control amount, and the control amount for the departure to the curve inside is set by performing the select-high. As a consequence, only the control amount for the departure to the curve outside, where the departure risk is greater (large control amount is required), can be set to be large. In the other scene, the control amount of the final target turning angle φt is not set to be too large, and the control performance in the traffic lane center Ls can be secured, also the control performance at the traffic lane L edge can be secured.

An example of its operation will be explained next.

Using the road curvature ρ, as shown below, the control amount is added for the departure to the curve outside, while the selection is performed for the departure to the curve inside.

In the case of ρ<0 (right curve), calculation is as follows.
Regarding the right control amount, if $\phi L\_Rt > \phi Y\_Rt$, $\phi tR = \phi L\_Rt$.

On the other hand, if $\phi L\_Rt \leq \phi Y\_Rt$, $\phi tR = \phi Y\_Rt$.

Regarding the left control amount, the addition value is taken as shown by the following expression.

$$\phi tL = \phi L\_Lt + \phi Y\_Lt$$

Conversely, in the case of ρ>0 (left curve), calculation is as follows.

Regarding the right control amount, the addition value is taken as shown by the following expression.

$$\phi tR = \phi L\_Rt + \phi Y\_Rt$$

Regarding the left control amount, if $\phi L\_Lt > \phi Y\_Lt$, $$\phi tL = \alpha\_L \times \phi L\_Lt.$$

On the other hand, if $\phi L\_Lt \leq \phi Y\_Lt$, $$\phi tL = \beta\_L \times \phi Y\_Lt.$$

Further, in the case of $\rho=0$, as shown below, the select-high is performed for the left and right sides separately.

Regarding the right side control amount, if $\phi L\_Rt > \phi Y\_Rt, \phi tR = \phi L\_Rt$, if $\phi L\_Rt \leq \phi Y\_Rt, \phi tR = \phi Y\_Rt$.

Regarding the left side control amount, if $\phi L\_Lt > \phi Y\_Lt, \phi tL = \phi L\_Lt$, if $\phi L\_Lt \leq \phi Y\_Lt, \phi tL = \phi Y\_Lt$.

Then, by the following expression, the final target turning angle $\phi t$ is calculated.

$$\phi t = \phi tR + \phi tL$$

Third Embodiment

Next, a third embodiment will be explained with reference to the drawings. Here, the same component as the above embodiments will be explained using the same reference sign.

The configuration of the vehicle to which a lane keeping assist device of the present embodiment is applied is the same as the first embodiment. Therefore, an explanation of the configuration of the vehicle is omitted.

Then the lane keeping assist device is provided for the vehicle having the above system configuration.

The configuration will be explained next.

A monocular camera with image processing function is mounted on the vehicle. This monocular camera with image processing function is an outside recognition means 16 to detect a position of the vehicle. The monocular camera with image processing function captures the road ahead of the vehicle. The monocular camera judges a road condition from the captured camera image, and outputs a signal concerning the vehicle position in the traffic lane where the vehicle is travelling to the lane keeping assist controller 15. The signal concerning the vehicle position in the traffic lane is information about a yaw angle θ that is an angle deviation of a travelling direction of the vehicle with respect to the traffic lane, a lateral displacement X from the traffic lane center and a curvature ρ of the traffic lane.

Further, a direction indicator switch 17 is provided. A signal of the direction indicator switch 17 is outputted to the lane keeping assist controller 15 as judgment information as to whether the driver changes the traffic lane.

The lane keeping assist controller 15 inputs signals such as a current steering state and a steering state of the road wheel from the steering controller 11. The lane keeping assist controller 15 calculates a control amount for keeping the vehicle in the traffic lane on the basis of the input signals, and outputs them at least to the steering controller 11.

Next, process in the lane keeping assist controller 15 will be explained with reference to FIG. 16.

This lane keeping assist controller 15 performs the process repeatedly at certain sampling intervals.

Upon a start of the process, at step S1100, each data from each sensor and the steering controller 11 etc. is read. Each road wheel speed Vw from road wheel speed sensors 18~21 is read. Further, a steering angle δ, a steering angular velocity δ' and the signal of the direction indicator switch 17 are read. The yaw angle θ of the vehicle with respect to a traffic lane L, the lateral displacement X from a traffic lane center Ls and the curvature ρ of the traffic lane L, from a camera controller of the outside recognition means 16, are each read.

Here, with regard to the lateral displacement X from the traffic lane center Ls, as shown in FIGS. 3 and 4, the lateral displacement X is determined with a position G of center of gravity of a vehicle C being a reference. However, it is also possible that the gravity center position G of the vehicle C is not the reference. For instance, the lateral displacement X from the traffic lane center Ls could be determined with a center of a front end portion of the vehicle C being the reference. That is, as shown in FIG. 4, first the front end portion of the vehicle C is displaced in a departure direction according to the yaw angle θ. Thus it is possible that the lateral displacement X is determined with the front end portion being the reference, then a lateral displacement deviation could be decreased earlier.

Subsequently, at step S1110, on the basis of the following expression (1) and expression (2), left and right lateral displacement reference threshold values XLt, XRt are set.

Here, as shown in FIG. 3, the right side lateral displacement reference threshold value XRt is a value that defines a position of a lateral displacement reference position LXR which is a reference of deviation of the lateral displacement X set for a right departure. The left side lateral displacement reference threshold value XLt is a value that defines a position of a lateral displacement reference position LXL which is a reference of deviation of the lateral displacement X set for a left departure.

$$XRt = (Wlane/2) - Wcar/2 - Xoffset \tag{1}$$

$$XLt = ((Wlane/2) - (Wcar/2) - Xoffset) \tag{2}$$

Here, regarding the lateral displacement X from the traffic lane center Ls, it is a positive when the vehicle C is positioned at the right side with respect to the center of the traffic lane L, and it is a negative when the vehicle C is positioned at the left side with respect to the center of the traffic lane L. Therefore, the right side lateral displacement reference threshold value XRt side is set to the positive.

Further, as shown in FIG. 3, Wlane is a traffic lane width, and Wcar is a vehicle width of the vehicle C.

Xoffset is a margin to a position of a traffic lane edge side Le (a white line). This margin Xoffset could be changed depending on the traffic lane width Wlane or the vehicle speed. For example, the traffic lane width Wlane is narrower, the margin Xoffset is smaller. Further, different margins Xoffset could be used for each of the left and right lateral displacement reference positions LXL, LXR. Or these left and right lateral displacement reference positions LXL, LXR could be fixed values.

Subsequently, at step S1120, on the basis of the following expression (3), a lateral displacement deviation ΔXR for the right departure is calculated.

$$\Delta XR = X - XRt \tag{3}$$

Here, in a case of $\Delta XR \leq 0$, $\Delta XR = 0$ (only a positive value is taken).

By the above expression (3), a relationship between the lateral displacement X and the lateral displacement deviation ΔXR for the right departure is given as shown in FIG. 5A.

That is, by using the expression (3), when "X−XRt" is "X−XRt≧0", it is judged that the vehicle C goes out from the right lateral displacement reference position LXR with respect to the traffic lane center Ls. This is a case where the vehicle C moves to the right side traffic lane edge side Le side. Therefore, the lateral displacement deviation ΔXR for the right departure is determined with the right side lateral displacement reference position LXR, which is the lateral displacement reference position near the vehicle C, being a reference of the lateral displacement deviation.

Subsequently, at step S1130, on the basis of the following expression (4), a lateral displacement deviation ΔXL for the left departure is calculated.

$$\Delta XL = X - XLt \quad (4)$$

Here, in a case of ΔXL≧0, ΔXL=0 (only a negative value is taken)

By the above expression (4), a relationship between the lateral displacement X and the lateral displacement deviation ΔXL for the left departure is given as shown in FIG. 5B.

That is, by using the expression (4), when "X−XLt" is "X−XLt≦0", it is judged that the vehicle C goes out from the left lateral displacement reference position LXL with respect to the traffic lane center Ls. This is a case where the vehicle C moves to the left side traffic lane edge side Le side. Therefore, the lateral displacement deviation ΔXL for the left departure is determined with the left side lateral displacement reference position LXL, which is the lateral displacement reference position near the vehicle C, being a reference of the lateral displacement deviation.

Subsequently, at step S1140, on the basis of the following expression (5), a yaw angle deviation ΔθR for the right departure is calculated. Here, the yaw angle θ of the vehicle C with respect to the traffic lane L is a positive when the yaw angle θ to the right side is formed (state like FIG. 4). The yaw angle θ is a negative when the yaw angle θ to the left side is formed.

$$\Delta \theta R = \theta \text{(in a case of } \theta > 0\text{)}$$

$$\Delta \theta R = 0 \text{(in a case of } \theta \leq 0\text{)} \quad (5)$$

By the above expression (5), a relationship between the yaw angle θ and the yaw angle deviation ΔθOR set only for the right departure is given as shown in FIG. 6A.

Subsequently, at step S1150, on the basis of the following expression (6), a yaw angle deviation ΔθL for the left departure is calculated.

$$\Delta \theta L = \theta \text{(in a case of } \theta < 0\text{)}$$

$$\Delta \theta L = 0 \text{(in a case of } \theta \geq 0\text{)} \quad (6)$$

By the above expression (6), a relationship between the yaw angle θ and the yaw angle deviation ΔθL set only for the left departure is given as shown in FIG. 6B.

Subsequently, at step S1160, a traffic lane edge side control feedback correction gain KρL_R for the right departure and a traffic lane edge side control feedback correction gain KρL_L for the left departure, according to a direction of the curve of the traffic lane L, the curvature ρ and the direction of the yaw angle θ (departure), are each determined.

That is, depending on a direction of the curvature ρ(the curve direction of the traffic lane L), the following three cases are set, and using individual maps, the traffic lane edge side control feedback correction gain KρL_R for the right departure and the traffic lane edge side control feedback correction gain KρL_L for the left departure are set.

In a case where the curvature ρ is judged that the curvature ρ<0 (right curve):
KρL_R: KρL_R is read from a curve-IN side correction gain map as shown in FIG. 7.
KρL_L: KρL_L is read from a curve-OUT side correction gain map as shown in FIG. 8.

In a case where the curvature ρ is judged that the curvature ρ>0 (left curve):
KρL_R: KρL_R is read from the curve-OUT side correction gain map as shown in FIG. 8.
KρL_L: KρL_L is read from the curve-IN side correction gain map as shown in FIG. 7.

In a case where the curvature ρ is judged that the curvature ρ=0 (straight road):
KρL_R=0 (no correction)
KρL_L=0 (no correction)

Here, the curvature ρ of the traffic lane L is an inverse of a turn radius. The curvature ρ is 0 at the straight road. As the curve becomes tighter (as the turn radius becomes smaller), an absolute value of the curvature ρ becomes larger. Further, the left curve is a positive, and the right curve is a negative.

As shown in FIG. 7, the curve-IN side correction gain map is a map in which when the absolute value of the curvature ρ is a certain value or more, as the absolute value of the curvature ρ becomes larger, the correction gain becomes smaller. Then the gain of the control for the traffic lane edge side Le, which is located at an inside of the curve of left and right traffic lane edge sides Le, is corrected so as to be decreased with increase in the absolute value of the curvature ρ.

As shown in FIG. 8, the curve-OUT side correction gain map is a map in which when the absolute value of the curvature ρ is a certain value or more, as the absolute value of the curvature ρ becomes larger, the correction gain becomes larger. Then the gain of the control for the traffic lane edge side Le, which is located at an outside of the curve of left and right traffic lane edge sides Le, is corrected so as to be increased with increase in the absolute value of the curvature ρ.

Subsequently, at step S1170, a traffic lane center side control feedback correction gain KρY_R for the right departure and a traffic lane center side control feedback correction gain KρY_L for the left departure, according to the direction of the curve of the traffic lane L, the curvature ρ and the direction of the lateral displacement X (departure), are each determined.

That is, depending on the direction of the curvature ρ (the curve direction of the traffic lane L), the following three cases are set, and using the maps, the traffic lane center side control feedback correction gain KρY_R for the right departure and the traffic lane center side control feedback correction gain KρY_L for the left departure are set.

In a case where the curvature ρ is judged that the curvature ρ<0 (right curve):
KρY_R: KρY_R is read from the curve-IN side correction gain map as shown in FIG. 7.
KρY_L: KρY_L is read from the curve-OUT side correction gain map as shown in FIG. 8.

In a case where the curvature ρ is judged that the curvature ρ>0 (left curve):
KρY_R: KρY_R is read from the curve-OUT side correction gain map as shown in FIG. 8.
KρY_L: KρY_L is read from the curve-IN side correction gain map as shown in FIG. 7.

In a case where the curvature ρ is judged that the curvature ρ=0 (straight road):
KρY_R=0 (no correction)
KρY_L=0 (no correction)

Here, in the case where the traffic lane edge side control feedback correction gain is determined and in the case where the traffic lane center side control feedback correction gain is determined, the curve-IN side correction gain map and the curve-OUT side correction gain map, each of which has the same trend between the both cases, are used. However, in the case where the traffic lane edge side control feedback correction gains KρL_R, KρL_L are determined and in the case where the traffic lane center side control feedback correction gains KρY_R, KρY_L are determined, the different maps whose slopes are different between the both cases are used. That is, the slope with respect to change of an absolute value of the curvature ρ in the curve-IN side correction gain map and the curve-OUT side correction gain map used for determining the traffic lane edge side control feedback correction gains KρL_R, KρL_L, is set to be greater than that for the traffic lane center side control feedback correction gains KρY_R, KρY_L. The reason why the slope for the traffic lane edge side control feedback correction gains KρL_R, KρL_L is greater is that when setting a correction amount according to the curvature ρ at the inside and outside of the curve of the traffic lane edge side Le side to be larger, response of the control becomes sensitive by an amount equivalent to this correction amount.

Subsequently, at step S1180, on the basis of the following expression (107) and expression (108), a target imaginary repulsion FL_Rt by the traffic lane edge side control for the right departure and a target imaginary repulsion FL_Lt by the traffic lane edge side control for the left departure are calculated.

$$FL\_Rt=((K\_L1 \times \Delta XR)+(K\_L2 \times \theta)+(K\_L3 \times \rho)) \quad (107)$$

$$FL\_Lt=-((K\_L1 \times \Delta XL)+(K\_L2 \times \theta)+(K\_L3 \times \rho)) \quad (108)$$

Here, K_L1, K_L2, K_L3 are feedback gains determined by specifications of the vehicle and the vehicle speed. Here, a second term and a third term of the above expressions (107) and (108) are correction terms (convergence terms) for the lateral displacement deviation. Thus, the feedback gains K_L2, K_L3 are set to be smaller than the feedback gain K_L1.

Further, imaginary repulsion in the right direction is a positive, and imaginary repulsion in the left direction is a negative.

That is, each target imaginary repulsion FL_Rt, FL_Lt by the traffic lane edge side control for the right departure and for the left departure is repulsion to determine a control amount by which the lateral displacement deviation from each lateral displacement reference position LXR, LXL is decreased. And at this time, the control amount is corrected by the yaw angle θ of the vehicle C and the road curvature ρ. The yaw angle θ part of the vehicle C of the second term in the expressions functions as a feedback control amount for a lateral velocity. Thus, as the yaw angle θ part of the vehicle C of the second term, the yaw angle deviations ΔθR and ΔθL are not used, but the yaw angle θ is used.

From the above, as shown at an after-mentioned step S1200, when calculating a final target imaginary repulsion Ft, it is calculated as the sum of the target imaginary repulsion FL_Rt by the traffic lane edge side control for the right departure and the target imaginary repulsion FL_Lt by the traffic lane edge side control for the left departure. That is, the sum of the target imaginary repulsion FL_Rt and the target imaginary repulsion FL_Lt is the target imaginary repulsion of the traffic lane edge side control part.

At this time, in a case where the vehicle C is positioned in a zone between the left and right lateral displacement reference positions LXL, LXR which is the traffic lane center Ls side, as shown in FIG. 5, both values of the lateral displacement deviations ΔXR, ΔXL become 0. Therefore, values of the above target imaginary repulsion FL_Rt and the above target imaginary repulsion FL_Lt become small values. As a consequence, the target imaginary repulsion of the traffic lane edge side control part becomes small, and after-mentioned target imaginary repulsions FY_Lt, FY_Rt of a traffic lane center side control part become predominant.

Further, in a case where the vehicle C is positioned out of the zone between the left and right lateral displacement reference positions LXL, LXR which is the traffic lane center Ls side, as shown in FIG. 5, only one value of the lateral displacement deviations ΔXR, ΔXL becomes 0. Therefore, of the above target imaginary repulsion FL_Rt and the target imaginary repulsion FL_Lt, one of the target imaginary repulsion FL_Lt and the target imaginary repulsion FL_Rt for the traffic lane edge side control, which is situated away from the vehicle C, becomes small. And the other of the target imaginary repulsion FL_Lt and the target imaginary repulsion FL_Rt for the traffic lane edge side control, which is situated near the vehicle C, becomes predominant as the target imaginary repulsion of the traffic lane edge side control part.

The yaw angle θ of the vehicle C with respect to the traffic lane L is provided in the second term as a differential term (the lateral velocity) with respect to the lateral displacement X, then the control is performed with this differential term fed beck as it is. Further, the third term is provided as the correction term for the road curvature ρ, then the feedback control is performed. As a result, by a first term, it is possible to keep the vehicle in the traffic lane L properly while avoiding movement in which the position of the vehicle C would be controlled to an outer side of the traffic lane L with the lateral displacement reference position being the reference. And by providing the second and third terms, it is possible to lessen the rebounding feeling of the vehicle C from the traffic lane edge side Le. That is, as the convergence term, by providing the second term (a differential value of a lateral direction displacement) and the third term (the convergence term for the curve of the road), convergence on the lateral displacement reference position becomes better.

Subsequently, at step S1190, on the basis of the following expression (109) and expression (110), a target imaginary repulsion FY_Rt by the traffic lane center side control for the right departure and a target imaginary repulsion FY_Lt by the traffic lane center side control for the left departure are calculated.

$$FY\_Rt=-Ky\_R \times \Delta \theta R \quad (109)$$

$$FY\_Lt=-Ky\_L \times \Delta \theta L \quad (110)$$

Here, Ky_R, Ky_L are feedback gains that are separately set according to the lateral displacement X with respect to the traffic lane L, as shown in FIG. 9.

That is, the target imaginary repulsion FY_Rt by the traffic lane center side control for the right departure is for a case where the travelling direction of the vehicle C points to the right side. Thus, the feedback gain Ky_R for the right departure is set so that as the vehicle C approaches the right side traffic lane edge side Le closer with respect to the left side traffic lane edge side Le side, the feedback gain Ky_R becomes larger.

Furthermore, the target imaginary repulsion FY_Lt by the traffic lane center side control for the left departure is for a case where the travelling direction of the vehicle C points to the left side. Thus, the feedback gain Ky_L for the left departure is set so that as the vehicle C approaches the left side traffic lane edge side Le closer with respect to the right side traffic lane edge side Le side, the feedback gain Ky_L becomes larger. Regarding the target imaginary repulsion FY_Rt and FY_Lt, repulsion in the right direction is a positive, and repulsion in the left direction is a negative.

Here, as shown at the after-mentioned step S1200, a final target imaginary repulsion of the traffic lane center side control part is calculated as the sum of the target imaginary repulsion FY_Rt by the traffic lane center side control for the right departure and the target imaginary repulsion FY_Lt by the traffic lane center side control for the left departure. At this time, in a case where the yaw angle θ to the right side is formed, as shown in FIG. 6B, since the ΔθL is 0, the target imaginary repulsion FY_Lt for the left departure becomes 0. Therefore, only the target imaginary repulsion FY_Rt for the right departure is employed. Likewise, in a case where the yaw angle θ to the left side is formed, as shown in FIG. 6A, since the ΔθR is 0, the target imaginary repulsion FY_Rt for the right departure becomes 0. Therefore, only the target imaginary repulsion FY_Lt for the left departure is employed.

At this time, as mentioned above, the control gains Ky_R, Ky_L are set so that, as shown in FIG. 9, the traffic lane edge side Le existing in the direction of the yaw angle θ of the vehicle C is set as a reference, and the closer the vehicle C approaches this traffic lane edge side Le, the larger the control gains Ky_R, Ky_L are. From this, in a case where the yaw angle θ occurs toward the departure side, the control is performed with a large control amount so as to actively prevent the departure. In addition, in a case where the yaw angle θ occurs toward a departure avoidance side, the control amount becomes small, then the travelling direction of the vehicle C can be fitted to a direction along the traffic lane L gently without the awkward feeling.

Further, the above control gains Ky_R, Ky_L are set so that, one traffic lane edge side Le is set as the reference, and the closer the vehicle C approaches this traffic lane edge side Le, the larger the control gains Ky_R, Ky_L are. With this, even when the vehicle C travels so as to cross or run on the traffic lane center Ls, the control amount is continuously varied, and thereby suppressing the awkward feeling when the vehicle crosses or runs on the traffic lane center Ls.

Furthermore, in a case where the displacement exists at the inside or the outside with respect to the traffic lane center Ls in the curve, as calculated at step S1170, by performing the correction according to the direction of the curve of the traffic lane L and the curvature ρ, the control can be achieved properly without the awkward feeling even in the curve.

Subsequently, at step S1200, the final target imaginary repulsion Ft for the lane keeping assist is calculated.

In the present embodiment, as shown in the following expression (111), the final target imaginary repulsion Ft is calculated as the sum of the left and right target imaginary repulsions FL_Lt, FL_Rt by the traffic lane edge side control calculated at step S1180 and the left and right target imaginary repulsions FY_Lt, FY_Rt by the traffic lane center side control calculated at step S1190.

$$Ft=(\alpha\_R \times FL\_Rt + \beta\_R \times FY\_Rt) + (\alpha\_L \times FL\_Lt + \beta\_L \times FY\_Lt) \quad (111)$$

Here, $\alpha\_R$, $\beta\_R$ are weighting factors for the traffic lane edge side control and the traffic lane center side control, for the right departure, respectively. $\alpha\_L$, $\beta\_L$ are weighting factors for the traffic lane edge side control and the traffic lane center side control, for the left departure, respectively.

The weighting factors $\alpha\_R$, $\beta\_L$ could be constant values, for example, it is $\alpha\_R=\alpha\_L=\beta\_R=\beta\_L=1$. Or relationships between the weighting factors $\alpha\_R$, $\alpha\_L$, $\beta\_R$, $\beta\_L$ could be set as shown in FIGS. 10A and 10B. In FIGS. 10A and 10B, magnitudes of $\beta\_R$, $\beta\_L$ relative to $\alpha\_R$, $\alpha\_L$ are changed according to the lateral position of the vehicle C.

Further, the relationships are expressed by the following expressions.

$$\alpha\_R + \beta\_R = 1.0$$

$$\alpha\_L + \beta\_L = 1.0$$

These weighting factors will be explained.

As expressed in the expression (107) and the expression (108), the feedback of a yaw angle element (the lateral velocity) is present as the second term of the target imaginary repulsions FL_Rt, FL_Lt by the traffic lane edge side control. This feedback is set as the differential term of a lateral displacement element to lessen the rebounding feeling from the traffic lane edge side Le. Thus, along with the feedback of the lateral displacement element, it becomes possible to improve convergence property on the lateral displacement reference position.

On the other hand, as expressed in the expression (109) and the expression (110), the feedback of a yaw angle θ element in the traffic lane center side control is set with the aim of fitting the travelling direction of the vehicle C to the traffic lane L.

Because of this, for example, in a case where the yaw angle θ to the left side (the departure side) is formed at the left edge side of the traffic lane L, if the yaw angle feedback in the traffic lane center side control is performed in addition to the lateral displacement feedback element in the traffic lane edge side control, an excess of control occurs. Further, in a case where the yaw angle θ to the right side (the departure avoidance side) is formed at the left edge side of the traffic lane L, the yaw angle feedback in the traffic lane center side control is set to be weak, then the convergence property on the lateral displacement reference position becomes worse, and the rebounding feeling from the traffic lane edge side Le occurs.

For this reason, in the present invention, for instance, as shown in FIGS. 10A and 10B, the weight is set so that as the vehicle C approaches the traffic lane edge side Le side closer, the weight of the traffic lane edge side control side becomes larger. On the other hand, the weight is set so that as the vehicle C approaches the traffic lane center Ls side closer, the weight of the traffic lane center side control side becomes larger. In this manner, these weights are set in accordance with the lateral position of the vehicle C with respect to the traffic lane L. By setting the weight in this manner, in the traffic lane center Ls, it is possible to realize a free chosen line without sense of restraint. Also, at the traffic lane edge side Le, it is possible to keep the vehicle in the traffic lane L properly and to lessen the rebounding feeling from the traffic lane edge side Le.

Subsequently, at step S1201, on the basis of the final target imaginary repulsion Ft, a final target turning angle ft of the vehicle is calculated. More specifically, a turning angle required to realize a displacement of the vehicle in the yaw direction when the final target imaginary repulsion Ft of the expression (111) is applied to the vehicle is calculated as the final target turning angle ft. First, moment in the yaw direction which occurs to the vehicle when the final target imaginary repulsion Ft is applied to the vehicle is calculated by an expression (112).

$$M = F \times (HB/2) \quad (112)$$

Here, HB is a wheelbase that indicates a distance between the front road wheel and the rear road wheel of the vehicle.

Next, from the moment M in the yaw direction, acceleration Yα in the yaw direction is calculated by an expression (113).

$$Y\alpha = M/I \qquad (113)$$

Here, I is yaw inertia moment of the vehicle and is determined from specifications of the vehicle such as dimensions, weight and weight distribution of the vehicle.

Next, using the acceleration Yα in the yaw direction, yaw rate Yr is calculated by an expression (114).

$$Yr = M/I \times Th \qquad (114)$$

Here, Th is a correction factor that sets an occurrence of the yaw rate Yr.

Next, from the yaw rate Yr, the final target turning angle ft is calculated. As a calculation method, for example, a plurality of methods have been proposed as a conventional method. Here, as an example, a method that calculates the final target turning angle ft using an Ackerman approximate expression by an expression (115) is shown.

<In a Case of Front Road Wheel Steering>

$$\text{final target turning angle } ft = +Yr \times HB/V$$

<In a Case of Rear Road Wheel Steering>

$$\text{final target turning angle } ft = -Yr \times HB/V \qquad (115)$$

Here, HB is the wheelbase that indicates a distance between the front road wheel and the rear road wheel of the vehicle, and V is the vehicle speed.

Regarding the final target turning angle ft, although the turning in the right direction is a positive and the turning in the left direction is a negative, since the turning direction is opposite between the cases where the final target turning angle is realized by the front road wheel steering and the final target turning angle is realized by the rear road wheel steering with respect to the turn direction of the vehicle (e.g. in a case where the vehicle turns in the left direction, if the front road wheels are steered, the turning direction becomes the left, while if the rear road wheels are steered, the turning direction becomes the right), signs of the final target turning angle ft calculated by the expression (115) become opposite.

Next, at step S1202, in order to inform the driver, change of the steering reaction force of the steering is calculated as a steering torque τ. The steering torque τ is calculated on the basis of expression (116) expression (120).

$$\tau L\_R = -FL\_Rt \times K\tau L \qquad (116)$$

$$\tau L\_L = -FL\_Lt \times K\tau L \qquad (117)$$

$$\tau Y\_R = -FY\_Rt \times K\tau Y \qquad (118)$$

$$\tau Y\_L = -FY\_Lt \times K\tau Y \qquad (119)$$

$$\tau = \tau L\_R + \tau L\_L + \tau Y\_R + \tau Y\_L \qquad (120)$$

Regarding sign of the imaginary repulsions FL_Rt, FL_Lt, FY_Rt, FY_Lt, the repulsion to the left is a negative, and the repulsion to the right is a positive. Regarding sign of the steering torque τ, the torque to the left is a positive, and the torque to the right is a negative.

Here, FL_Rt, FL_Lt, FY_Rt, FY_Lt are the target imaginary repulsions determined by the expression (107)~the expression (110).

Further, KτL, KτY are weighting factors to determine a magnitude of the steering torque. If they are set to large values, the steering torque becomes large. Therefore, KτL, KτY are determined so as to increase the steering torque within a range in which the driver does not feel the awkward feeling.

Subsequently, at step S1210, driver's intention to change the traffic lane is judged. More specifically, on the basis of the direction indicator switch signal obtained at step S1100 and the travelling direction of the vehicle C, a judgment is made as to whether or not the driver changes the traffic lane L.

That is, when a direction (direction indicator light-on side) indicated by the direction indicator switch signal and the travelling direction of the vehicle C are the same direction, it is judged that the driver intends to change the traffic lane L. In this case, the process is reset without performing a correction of the turning angle at step S1220. Here, it is also possible that, when the steering of the steering wheel 12 is the same direction as the direction (direction indicator light-on side) indicated by the direction indicator switch signal, it is judged that the driver intends to change the traffic lane L.

Subsequently, at step S1220, a correction turning angle command value of the final target imaginary repulsion Ft calculated at step S1200 is outputted to the steering controller 11. At the same time, the steering torque τ calculated at step S1202 is outputted to the steering reaction force actuator 3.

Here, as described above, when the steering controller 11 inputs the correction turning angle command value of the final target imaginary repulsion Ft from the lane keeping assist controller 15, the steering controller 11 adds the final target imaginary repulsion Ft to the target imaginary repulsion calculated according to the steering operation of the driver then sets this as a final target imaginary repulsion, and the steering controller 11 drives the turning actuator 5 so as to realize a turning angle according to this target imaginary repulsion.

Further, as the vehicle C in which the lane keeping assist device of the present invention is provided, the vehicle C employing the steer-by-wire system is exemplified. In a case of the vehicle C in which a power steering system using power or hydraulic pressure is mounted, it is also possible that, the final target imaginary repulsion Ft is converted to a correction amount of an assist torque amount, and by adding this to an assist torque, the correction of the turning angle part is performed.

Further, in the vehicle C that is capable of changing the turning angle by rotating and changing the steering shaft, its rotating and changing amount could be corrected by an amount of the above final target imaginary repulsion Ft.

The other configuration is the same as the above first or second embodiment.

Here, the left and right lateral displacement reference positions LXL, LXR form both of the lateral direction displacement threshold values and the lateral displacement reference positions. Steps S1180, S1190 form a target imaginary repulsion calculation means. Step S1200 and the steering controller 11 form a travelling direction control means. The expression (4) and the expression (5) correspond to a configuration that sets the lateral displacement deviation to zero or decreases the control gain when positioned between the left and right lateral direction displacement threshold values. The expression (109) and the expression (110) form a second target imaginary repulsion calculation means, and their target imaginary repulsions FY_Rt, FY_Lt are a second target imaginary repulsion. The expression (107) and the expression (108) form a first target imaginary repulsion calculation means, and their target imaginary repulsions FL_Rt, FL_Lt are a first target imaginary repulsion. Furthermore, the final target imaginary repulsion Ft forms a final target imaginary repulsion. Moreover, the correction gains KρL_R, KρL_L, KρY_R, KρY_L form a curve road correction means. The left and right traffic lane edge sides Le form lateral edge side reference positions. The weighting factors β_R, β_L form a second weighting factor. The weighting factors α_R, α_L form a first weighting factor. The yaw angle deviation ΔθR or ΔθL forms an angle deviation.

(Operation•Function)

In the first embodiment, on the basis of the lateral displacement deviation ΔX and the yaw angle θ, the target turning angle φL as the control amount is directly calculated.

In contrast, in the present embodiment, on the basis of the lateral displacement deviation ΔX and the yaw angle θ, first, as a primary output, the final target imaginary repulsion Ft as a force that is applied to the vehicle from a traffic lane width direction is calculated. Then, as a secondary output, the target turning angle as the control amount is calculated from the final target imaginary repulsion Ft.

In addition, in synchronization with the control of the above lane keeping assist, the change of the steering reaction force of the steering according to the imaginary repulsion is inputted as the steering torque. With this, the fact that the control of the lane keeping assist has been carried out is informed to the driver.

(Effect of the Present Embodiment)

(1) In the case where the vehicle is positioned at the traffic lane edge side with respect to the lateral direction displacement threshold value, in order to return the vehicle to the center side of the traffic lane width direction with respect to the lateral direction displacement threshold value on the basis of the lateral displacement deviation of the vehicle from the above lateral direction displacement threshold value, the first target imaginary repulsion that is imaginarily applied to the vehicle from the traffic lane edge side toward the traffic lane center side is calculated. Further, in the case where the vehicle is positioned at the traffic lane center side with respect to at least the lateral direction displacement threshold value, when getting closer to at least the lateral direction displacement threshold value, the second target imaginary repulsion that is imaginarily applied to the vehicle from the traffic lane width direction is calculated so that the angle deviation of the travelling direction of the vehicle with respect to the traffic lane becomes small.

Then, in order that vehicle behavior equivalent to a case where the calculated target imaginary repulsion acts on the vehicle occurs, the travelling of the vehicle is controlled on the basis of the target imaginary repulsion.

With this, in the case where the vehicle C is positioned within the left and right lateral direction displacement threshold values, i.e. in the case where the vehicle C is positioned at the traffic lane center side with respect to the lateral direction displacement threshold value, such imaginary repulsion that the travelling direction of the vehicle becomes the direction along the traffic lane L can be added to the vehicle. As a consequence, at the traffic lane center Ls side, the free chosen line without sense of restraint can be achieved.

On the other hand, in the case where the vehicle C is positioned out of the left and right lateral direction displacement threshold values, i.e. in the case where the vehicle C is positioned at the traffic lane edge side with respect to the lateral direction displacement threshold value, such imaginary repulsion that the vehicle C is returned to the lateral direction displacement threshold value can be added to the vehicle C.

With this, when the vehicle C enters the departure area that is the area out of the lateral direction displacement threshold value, an effect of returning the vehicle within the lateral direction displacement threshold value is produced.

(2) The control amount that controls the vehicle behavior is determined from the target imaginary repulsion.

That is, as the primary output, the target imaginary repulsion Ft that is the force applied to the vehicle is determined. Subsequently, the target imaginary repulsion Ft is converted to the control output such as the turning and the braking/driving force which control the vehicle behavior, then the vehicle behavior that would occur when the target imaginary repulsion Ft is applied to the vehicle is realized.

With this, it becomes easy to perform the correction control of the vehicle behavior, which is the goal, in combination with a plurality of control devices, thus control flexibility for the departure control is increased. Further, this facilitates integration with the other control.

That is, it is possible that the target imaginary repulsion Ft is divided between the turning correction and the braking correction.

Moreover, in a case where the control of the present embodiment and other control that differs from the present embodiment, e.g. a control in which a direction of generation of the braking force is different, such as a following distance control between a forward vehicle and the vehicle, are simultaneously performed, there is a need to integrate a plurality of different control amounts. In order to integrate the control, the integration is achieved with a plurality of control outputs, which is integrated, unified into a physical quantity of the same dimension.

At this time, in the control of the present embodiment, the turning angle that is a result of the control is not directly determined as the control amount, but the target imaginary repulsion Ft that is a variable showing the force is determined as the primary output. In general, since it is easy to output the force as the output of the vehicle control, it is possible to merge the control output of the present embodiment and the control output of the other control in the dimension of the force. Therefore, the integration control with the other control becomes easy.

(3) The second target imaginary repulsion is calculated as imaginary repulsion of a preliminary control to reduce the above first target imaginary repulsion before the vehicle reaches the lateral direction (displacement threshold value from the traffic lane center side.

By applying the second target imaginary repulsion to the vehicle from the traffic lane width direction so as to decrease the angle deviation of the travelling direction of the vehicle, it is possible to decrease the passing angle when the vehicle enters the departure area.

With this, the control by the control amount based on the second target imaginary repulsion provides the effect as the preliminary control for the departure prevention.

That is, in the case where the passing angle is small, the departure amount to the outer side of the lateral direction displacement threshold value after the vehicle enters the departure area becomes small. Then, when the vehicle enters the departure area, the first target imaginary repulsion to decrease the lateral displacement deviation becomes small.

As a result, the rebounding feeling from the traffic lane edge side can be diminished, and the awkward feeling which the driver feels as if the control to the departure side intervenes can be lessened. That is, the sense of restraint which the driver feels can be reduced.

(4) In at least a part of the area (in the double control area) in a range of the lane edge side with respect to the lateral direction displacement threshold value, the control is carried out on the basis of the both target imaginary repulsions of the first target imaginary repulsion and the second target imaginary repulsion.

Therefore, if the vehicle C is positioned out of the lateral direction displacement threshold value with respect to the traffic lane center Ls, the both feedback controls of the lateral displacement X and the yaw angle θ are performed. As a consequence, the lane keeping assist which keeps the vehicle C in the traffic lane L properly and lessens the rebounding feeling from the traffic lane edge side Le, at the traffic lane edge side Le side, can be performed.

That is, in the double control area on the lateral direction displacement threshold value side in the departure area, such vehicle behavior that the imaginary repulsion by the sum of both target imaginary repulsions is applied to the vehicle can be achieved.

That is, in the case where the vehicle travels in the direction moving away from the lateral direction displacement threshold value in the departure area, the control amount of the first target imaginary repulsion and the control amount of the second target imaginary repulsion are the control amounts of the same direction (the departure avoidance direction). As a result, the control amount to the departure avoidance side becomes large, and the departure can be prevented more effectively, namely that the departure prevention effect becomes great.

On the other hand, in the case where the vehicle runs toward the lateral direction displacement threshold value in the departure area, the control amount of the first target imaginary repulsion and the control amount of the second target imaginary repulsion are the control amounts of an opposite direction. As a result, while lessening the awkward feeling which the driver feels as if the control to the departure side intervenes, it becomes possible to return the vehicle within the left and right lateral direction displacement threshold values.

In this manner, by controlling the vehicle to a state in which the sum of the two imaginary repulsions is applied to the vehicle, the radius of the trace line of the vehicle for the departure avoidance can be large. This means that, acceleration/deceleration of the yaw direction can be small, then the rebounding feeling can be small more surely.

(5) The final target imaginary repulsion is calculated from the sum of the value obtained by multiplying the first target imaginary repulsion by the first weighting factor and the value obtained by multiplying the second target imaginary repulsion by the second weighting factor. At this time, the first weighting factor and the second weighting factor are changed according to the lateral displacement deviation, and are set so that the larger the lateral displacement deviation is, the larger the first weighting factor is as compared with the second weighting factor.

That is, the weight is set so that as the vehicle gets closer to the traffic lane edge side Le side, the weight of the first target imaginary repulsion becomes larger. On the other hand, the weight is set so that as the vehicle gets closer to the traffic lane center Ls side, the weight of the second target imaginary repulsion becomes larger. In this manner, these weights are set in accordance with the lateral position of the vehicle C with respect to the traffic lane L.

As a consequence, at the traffic lane center Ls side, the yaw angle control becomes predominant, and the free chosen line without sense of restraint is realized. On the other hand, at the traffic lane edge side Le side, the feedback control by the lateral displacement X becomes predominant, and it is possible to keep the vehicle in the traffic lane L properly and to lessen the rebounding feeling from the traffic lane edge side Le.

In particular, in the present embodiment, in the first target imaginary repulsions FL_Rt, FL_Lt by the traffic lane edge side control, although the yaw angle feedback part as the convergence term (the second term) is present, it is possible to reduce the excess of the control that decreases the angle deviation by the above weighting factor.

(6) The first target imaginary repulsion is corrected by a lateral displacement velocity. That is, as the second term for calculating the first target imaginary repulsions FL_Rt, FL_Lt by the traffic lane edge side control, the imaginary repulsion of the lateral displacement velocity is added.

As a result, the convergence property of the lateral displacement X on the lateral displacement reference position becomes better. With this, it is possible to further lessen the rebounding feeling from the traffic lane edge side Le.

In addition, also there is the effect of enlarging the turning radius of the vehicle when turning from the departure side to the departure avoidance direction.

(7) The control gain of the second target imaginary repulsion is corrected by the distance of the vehicle to the traffic lane edge side which is located at the travelling direction side of the vehicle, and the control gain is corrected so that the shorter the distance of the vehicle to the traffic lane edge side is, the larger the control gain is.

For example, in the case where the yaw angle θ to the right side is formed, the control gain is set so that as the vehicle gets closer to the right side traffic lane edge side Le from the left side traffic lane edge side Le, the control gain becomes larger. In the case where the yaw angle θ to the left side is formed, the control gain is set so that as the vehicle gets closer to the left side traffic lane edge side Le from the right side traffic lane edge side Le, the control gain becomes larger.

As a result, even if the feedback control by the lateral displacement X is not carried out, by controlling the travelling direction (the yaw angle θ) of the vehicle, the lane keeping assist without the awkward feeling (the sense of restraint) caused by the difference from the driving line of driver's intention to drive can be performed.

Further, in the case where the yaw angle θ to the departure side is formed, the control gain (the control amount) is set to be large, then the departure prevention effect is secured. On the other hand, in the case where the yaw angle θ to the departure avoidance side is formed, the control gain (the control amount) is set to be small, then the awkward feeling such as the excess of control can be lessened too.

At this time, by setting the control gain (the control amount) of the case where the yaw angle θ to the departure avoidance side is formed to be small, even if the control gain (the control amount) of the case where the yaw angle θ to the departure side is formed is set to be large, oscillation (hunting) is less prone to occur, and the greater departure prevention effect can be obtained.

(8) As the third term when determining the first target imaginary repulsions FL_Rt, FL_Lt, the control amount according to the curvature ρ of the traffic lane L is added.

As a result, even in the case where the traffic lane L is the curve road, the convergence property of the lateral displacement X on the lateral displacement reference position becomes better.

(9) The curve road correction means is provided.

In a case where the curvature ρ of the traffic lane L is a certain value or more, i.e. in the case where the traffic lane L is the curve road, the correction is performed by the different control gains between the curve inside and the curve outside with respect to the width direction center. That is, in the case where the vehicle C is positioned at the curve inside of the traffic lane L with respect to the width direction center of the traffic lane L, when the curvature is large, the control gain is corrected and set to be small, as compared with the small curvature. On the other hand, in the case where the vehicle C is positioned at the curve outside of the traffic lane L with respect to the width direction center of the traffic lane L, when the curvature is large, the control gain is corrected and set to be large, as compared with the small curvature.

As a consequence, the excess of control at the curve inside can be prevented. That is, the awkward feeling which the occupant feels as if the occupant is flicked away to the curve outside, which arises when the control amount is large, can be lessened.

Further, an insufficient control at the curve outside can be prevented. That is, the control intervention when the yaw angle θ to the curve outside occurs becomes strong, and the departure prevention effect becomes great.

(10) By calculating the final target imaginary repulsion Ft first, when informing the driver of the control amount with stimulus given to visual sense or auditory sense or tactile sense of the driver, the final target imaginary repulsion can be used as a reference for determining a magnitude or a tendency of the stimulus. Here, the tendency is the number of repetitions of the stimulus (the number of times the stimulus is given to the driver), a duration of the stimulus, an interval of the stimulus, a timing when the stimulus upon the start of the control is given, and so on. Thus, as compared with a case where the magnitude or the tendency of the stimulus to inform the driver is determined on the basis of the final target turning angle that is determined by avoidance operation performance, it becomes easier for the stimulus to be adjusted to stimulus suited to a sense of the driver. As a consequence, the awkward feeling of the driver can be lessened.

(11) By correcting the turning of the road wheels of at least one of the front road wheels and the rear road wheels, the correction of the travelling direction of the vehicle is controlled.

With this, it is possible that the target behavior occurs to the vehicle.

(12) The other effects are the same as the above first embodiment.

(Modification)

(1) It is possible that, after performing the select-high of the first target imaginary repulsion and the second target imaginary repulsion for the left and right sides separately, by calculating the sum of the left and right target imaginary repulsions, the final target imaginary repulsion is calculated.

If the first target imaginary repulsion and the second target imaginary repulsion are merely added when calculating the final target imaginary repulsion, in a case where a large yaw angle θ is formed etc., there is a problem that the control amount might become excessive at the edge side of the traffic lane L. In order to solve this problem, such method that the control gains are uniformly lowered could be employed. However, in this case, control performance is degraded.

In contrast, by performing the select-high, the control performance at the traffic lane center Ls side can be secured, and the control performance at the traffic lane edge side Le side can be secured, while preventing the control amount based on the final target imaginary repulsion from being excessive.

(2) In the above embodiment, at step S1201, on the basis of the final target imaginary repulsion Ft, the final target turning angle ft or a final target turning torque of the vehicle is calculated as the control amount. Instead of this, on the basis of the final target imaginary repulsion Ft, braking/driving amount or braking/driving force could be calculated as the control amount.

With this, it is possible that the target behavior occurs to the vehicle.

Its example will be shown.

As described above, a braking force required to realize a displacement of the vehicle in the yaw direction when the final target imaginary repulsion Ft of the expression (111) is applied to the vehicle is calculated as a final target braking force. First, moment in the yaw direction which occurs to the vehicle when the final target imaginary repulsion Ft is applied to the vehicle is calculated by an expression (112).

$$M = F \times (HB/2) \tag{112}$$

Here, HB is a wheelbase that indicates a distance between the front road wheel and the rear road wheel of the vehicle.

Next, in order to generate the moment in the yaw direction, in accordance with a target yaw moment Ms, a target braking fluid pressure Ps of each road wheel is calculated. In a case where the target yaw moment Ms is smaller than a setting value Ms0, a difference of the braking force between the left and right road wheels of the rear road wheels is given. In a case where the target yaw moment Ms is greater than the setting value Ms0, the braking force difference between the left and right road wheels of the front and rear road wheels is given.

First, target braking fluid pressure differences ΔPs_f, ΔPs_r are calculated from the target yaw moment Ms by the following expression.

In a case of |Ms|<Ms0, $$\Delta Ps\_f = 0$$

$$\Delta Ps\_r = 2 \times Kb\_r \times |Ms|/T$$

In a case of |Ms|−Ms0, $$\Delta Ps\_f = 2 \times Kb\_f \times (|Ms| - Ms0)/T$$

$$\Delta Ps\_r = 2 \times Kb\_r \times Ms0/T$$

Here, T indicates a tread. Further, Kb_f, Kb_r are conversion factors when converting the braking force to the braking fluid pressure, and are determined by specifications of the brake.

Next, from an occurrence direction of the yaw moment, the target braking fluid pressure Ps of each road wheel is calculated with consideration given to a master cylinder fluid pressure Pm too, which is a braking operation by the driver.

At the occurrence of the yaw moment in right direction:

$$Ps\_fl = Pm$$

$$Ps\_fr = Pm + \Delta Ps\_f$$

$$Ps\_rl = Pm\_r$$

$$Ps\_rr = Pm\_r + \Delta Ps\_r$$

At the occurrence of the yaw moment in left direction:

$$Ps\_fl = Pm + \Delta Ps\_f$$

$$Ps\_fr = Pm$$

$$Ps\_rl = Pm\_r + \Delta Ps\_r$$

$$Ps\_rr = Pm\_r$$

Here, Pm_r is a rear road wheel master cylinder fluid pressure, taking account of front/rear distribution calculated from Pm.

Next, in accordance with the calculated target braking fluid pressure Ps, the braking fluid pressure is generated by the pressure control unit.

With this, the yaw moment by which the target vehicle behavior occurs is generated.

(3) In the above explanation, the final target turning angle or the final target braking force, required to realize the occurrence of the yaw moment of the vehicle when the final target imaginary repulsion Ft is applied to the vehicle, is calculated. Instead of this, or together with this, also it is possible to realize the above yaw moment by change of the driving force.

Or, also it is possible that the control is performed so as to generate the above yaw moment in combination with the change of the driving force, the braking force and the turning.

Also in this case, the target behavior can occur to the vehicle.

(4) When generating the yaw moment, the yaw moment could be generated so that a direction of force in the yaw direction which the front road wheel generates against ground and a direction of force in the yaw direction which the rear road wheel generates against ground are the same direction.

In this case, it is possible to shift the vehicle in the lateral direction while suppressing change of the yaw angle direction.

(5) Furthermore, the yaw moment could be generated so that the force in the yaw direction which the front road wheel generates against ground and the force in the yaw direction which the rear road wheel generates against ground are opposite directions.

In this case, it is possible to shift the vehicle in the lateral direction while actively generating the change of the yaw angle direction.

(6) Moreover, the yaw moment could be generated so that a magnitude of the force in the yaw direction which the front road wheel generates against ground and a magnitude of the force in the yaw direction which the rear road wheel generates against ground are different magnitude.

With this, it is possible to adjust the generated yaw moment.

Fourth Embodiment

Next, a fourth embodiment will be explained with reference to the drawings. Here, the same component as the first embodiment will be explained using the same reference sign.

In the control in the above first to third embodiments, cases where the behavior control of the vehicle is performed, as driving support of the driver, are exemplified.

Here, when actually executing the vehicle behavior control, if only the vehicle behavior control is performed without attracting the attention, which the driver can recognize, to the driver, there is a possibility that the driver will feel the awkward feeling.

In the present embodiment, an example that deals with this matter will be explained.

Figure 17:
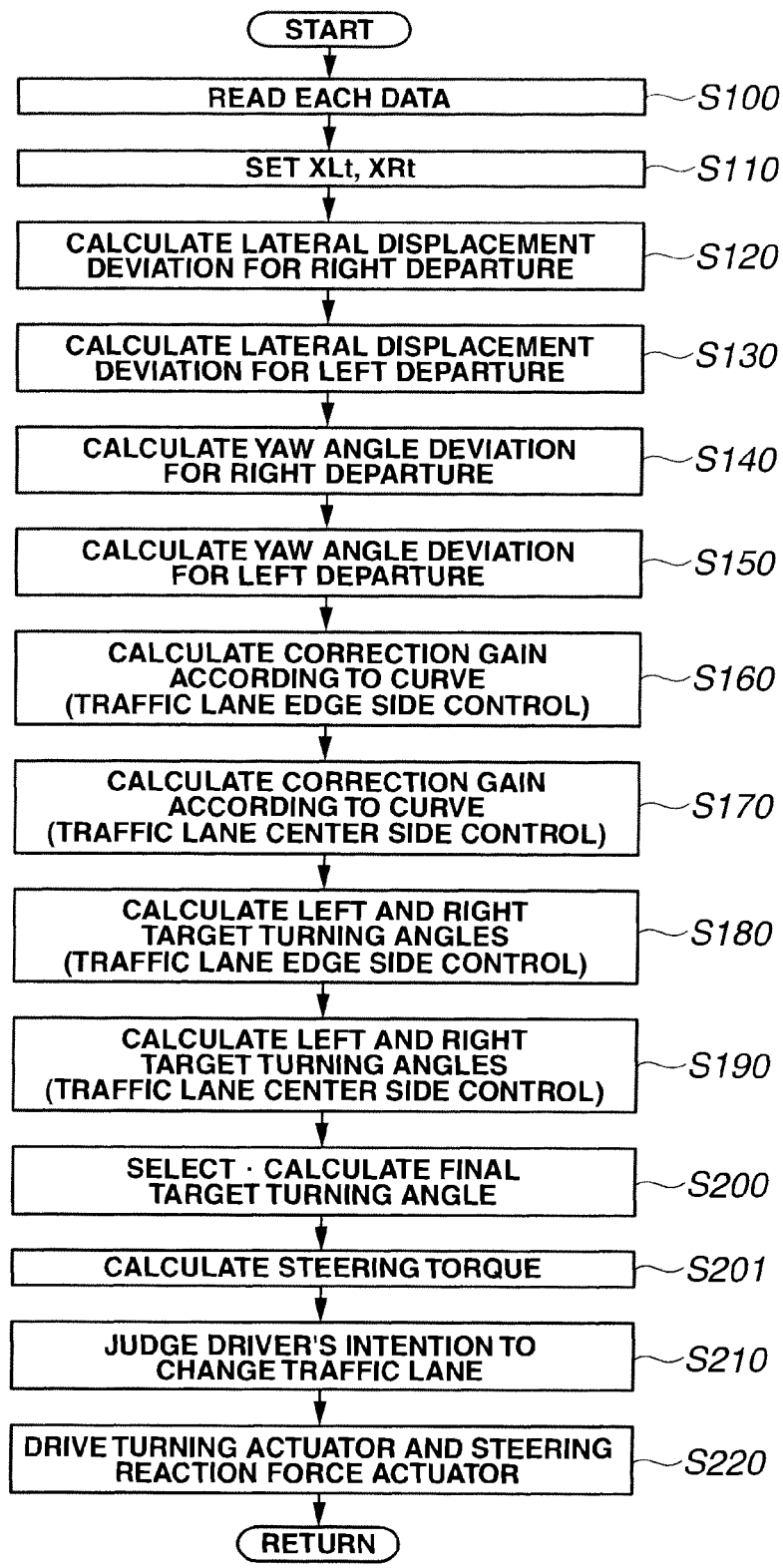
FIG. 17 is a drawing for explaining a process in a lane keeping assist controller according to a fourth embodiment of the present invention.

Process in the lane keeping assist controller of the present embodiment will be explained with reference to FIG. 17.

Processes from step S100 to step S200 are the same as those in the lane keeping assist controller of the first embodiment.

In the lane keeping assist controller of the present embodiment, after the process at step S200 is ended, the routine proceeds to step S201.

At step S201, in order to inform the driver, change of the steering reaction force of the steering is calculated as a steering torque τ.

The steering torque τ is calculated on the basis of expression (200)~expression (204). That is, a steering torque τL_R in right direction of the lateral position control part, a steering torque τL_L in left direction of the lateral position control part, a steering torque τY_R in right direction of the yaw angle control part, and a steering torque τY_L in left direction of the yaw angle control part are each calculated. Subsequently, a final steering torque τ is determined by calculating the sum of them.

$$\tau L\_R = (Kc\_L1 \times Kv\_L1 \times \Delta XR) + (Kc\_L2 \times Kv\_L2 \times \theta) + (Kc\_L3 \times Kv\_L3 \times \rho) \quad (200)$$

$$\tau L\_L = (Kc\_L1 \times Kv\_L1 \times \Delta XL) + (Kc\_L2 \times Kv\_L2 \times \theta) + (Kc\_L3 \times Kv\_L3 \times \rho) \quad (201)$$

$$\tau Y\_R = Kc\_Y \times Kv\_Y \times KY\_R \times \Delta \theta R \quad (202)$$

$$\tau Y\_L = Kc\_Y \times Kv\_Y \times KY\_L \times \Delta \theta L \quad (203)$$

$$\tau = \tau L\_R + \tau L\_L + \tau Y\_R + \tau Y\_L \quad (204)$$

Here, Kc_L1, Kc_L2, Kc_L3 are feedback gains determined by specifications of the vehicle.

Kv_L1, Kv_L2, Kv_L3 are correction gains according to the vehicle speed. For instance, Kv_L1, Kv_L2, Kv_L3 increase with the vehicle speed.

Here, a second term and a third term of the above expressions (200) and (201) are correction terms (convergence terms) for the lateral displacement deviation. Thus, the feedback gains Kc_L2, Kc_L3 are set to be smaller than the feedback gain Kc_L1. Likewise, the correction gains Kv_L2, Kv_L3 are set to be smaller than the correction gain Kv_L1.

Kc_Y is a feedback gain determined by the specifications of the vehicle. Kv_Y is a correction gain according to the vehicle speed. For instance, Kv_Y is set so that the higher the vehicle speed is, the larger the Kv_Y is.

Further, Ky_R, Ky_L are feedback gains that are separately set according to the lateral displacement X with respect to the traffic lane L, as shown in FIG. 9.

That is, a target steering torque τY_R corresponding to the target turning angle φY_Rt by the traffic lane center side control for the right departure is for a case where the travelling direction of the vehicle C points to the right side. Thus, the feedback gain Ky_R for the right departure is set so that as the vehicle C approaches the right side traffic lane edge side Le closer with respect to the left side traffic lane edge side Le side, the feedback gain Ky_R becomes larger.

Furthermore, a target steering torque τY_L corresponding to the target turning angle φY_Lt by the traffic lane center side control for the left departure is for a case where the travelling direction of the vehicle C points to the left side. Thus, the feedback gain Ky_L for the left departure is set so that as the vehicle C approaches the left side traffic lane edge side Le closer with respect to the right side traffic lane edge side Le side, the feedback gain Ky_L becomes larger. Regarding the target turning angle φY_Rt and φY_Lt, turning in the right direction is a positive, and turning in the left direction is a negative. Regarding the target steering torque τY_R and φY_L, torque in the left direction is a positive, and torque in the right direction is a negative.

Subsequently, the routine proceeds to step S210, driver's intention to change the traffic lane is judged, same as the first embodiment. More specifically, on the basis of the direction indicator switch signal obtained at step S100 and the travelling direction of the vehicle C, a judgment is made as to whether or not the driver changes the traffic lane L.

That is, when a direction (direction indicator light-on side) indicated by the direction indicator switch signal and the travelling direction of the vehicle C are the same direction, it is judged that the driver intends to change the traffic lane L. In this case, the process is reset without performing a correction of the turning angle and an informing operation at step S220.

Here, it is also possible that, when the steering of the steering wheel 12 is the same direction as the direction (direction indicator light-on side) indicated by the direction indicator switch signal, it is judged that the driver intends to change the traffic lane.

Subsequently, at step S220, a correction turning angle command value of the final target turning angle φt calculated at step S200 is outputted to the steering controller 11.

Further, in the present embodiment, the steering torque τ calculated at step S201 is outputted to the steering reaction force actuator 3.

The other configuration is the same as the above first or second embodiment.

(Operation)

In synchronization with the control of the above lane keeping assist, the change of the steering reaction force of the steering according to the control amount of the lane keeping assist is inputted as the steering torque τ. With this, the fact that the control of the lane keeping assist has been carried out is informed to the driver.

(Effect of the Present Embodiment)

(1) Basic effects are the same as the above embodiments.
(2) When executing the vehicle behavior control, it is possible to attract the attention, which the driver can recognize, to the driver. With this, the awkward feeling which the driver feels, caused by the execution of the vehicle behavior control, can be lessened.

(Modification)

(1) A different calculation method of the steering torque τ, as an informing means, calculated at step S201 will be explained.

That is, the steering torque τ could be calculated on the basis of expression (205)~expression (209) instead of the above expression (200)~expression (204).

$$\tau L\_R = fL\_Rt \times K\tau L \quad (205)$$

$$\tau L\_L = fL\_Lt \times K\tau L \quad (206)$$

$$\tau Y\_R = fY\_Rt \times K\tau Y \quad (207)$$

$$\tau Y\_L = fY\_Lt \times K\tau Y \quad (208)$$

$$\tau = \tau L\_R + \tau L\_L + \tau Y\_R + \tau Y\_L \quad (209)$$

Here, fL_Rt, fL_Lt are the target turning angle φL_Rt, φL_Lt of the above expression (7) and expression (8). fY_Rt, fY_Lt are the target turning angle φY_Rt, φY_Lt of the above expression (9) and expression (10).

Further, KτL, KτY are weighting factors to determine a magnitude of the steering torque. If they are set to large values, the steering torque becomes large. Therefore, KτL, KτY are determined so as to increase the steering torque within a range in which the driver does not feel the awkward feeling.

(2) In addition, in the above embodiment, as the informing means, the steering torque is utilized. However, instead of the steering torque, a means that stimulates the visual sense, for example, blink signal of the lamp 44 in the meter cluster could be utilized. Or it is possible to sound warning sound, which stimulates the auditory sense, by the warning device 45.

As described above, in each embodiment, the control of the travelling direction of the vehicle has been explained. However, the control of the present invention can also be applied to a travelling direction control of an object.

That is, a controller that controls the travelling direction of the object has a lateral direction position information obtaining means that obtains information concerning a lateral direction position of the object, a lateral direction displacement threshold value setting means that sets lateral direction displacement threshold values (a first lateral direction displacement threshold value, a second lateral direction displacement threshold value) each in both side directions of the object, a first control amount calculating means that calculates a control amount of a lateral displacement deviation control (a first control) which decreases a lateral displacement deviation of the object from the first lateral direction displacement threshold value or the second lateral direction displacement threshold value, a second control amount calculating means that calculates a control amount of an angle deviation control (a second control) which decreases an angle deviation in the travelling direction of the object, and a means that detects the lateral direction position of the object or a lateral direction displacement threshold value passing judging means that detects and judges whether or not the lateral direction position of the object exceeds either of the lateral direction displacement threshold values across a range of the first and second lateral direction displacement threshold values. And in a case where the lateral direction position of the object is within the first and second lateral direction displacement threshold values, the angle deviation control (the second control) is performed (or a command signal of the angle deviation control is outputted), also in a case where the lateral direction position of the object is out of the first and second lateral direction displacement threshold values, at least the lateral displacement deviation control (the first control) is performed (or at least a command signal of the lateral displacement deviation control is outputted), then the object is controlled to within the first and second lateral direction displacement threshold values.

Further, in the controller, when the controller judges that the lateral direction position of the object exceeds either of the lateral direction displacement threshold values across the range of the first and second lateral direction displacement threshold values, both controls of the lateral displacement deviation control (the first control) and the angle deviation control (the second control) are performed (or both signals of the lateral displacement deviation control (the first control) and the angle deviation control (the second control) are outputted) in apart of an area (in a double control area) out of the lateral direction displacement threshold value.

In these both controls, in a case where the lateral direction position of the object is positioned in a direction moving away from the lateral direction displacement threshold value out of the lateral direction displacement threshold value, directions of the control amount of the lateral displacement deviation control (the first control) and the control amount of the angle deviation control (the second control) become the same direction (a direction that returns the object within the first and second lateral direction displacement threshold values). In a case where the lateral direction position of the object is positioned in a direction toward the lateral direction displacement threshold value out of the lateral direction displacement threshold value, the directions of the control amount of the lateral displacement deviation control (the first control) and the control amount of the angle deviation control (the second control) become opposite directions.

Furthermore, in the double control area, the control amount is set so that the farther the lateral direction position of the object is positioned away from the lateral direction displacement threshold value, the larger the weight of the control amount of the lateral displacement deviation control (the first control) as compared with weight of the control amount of the angle deviation control (the second control).

The invention claimed is:

1. A lane keeping assist device comprising:
a lateral direction displacement obtaining section configured to obtain information concerning a lateral direction displacement of a vehicle with respect to a traffic lane;
a lateral direction displacement threshold value setting section configured to set a lateral direction displacement threshold value for the traffic lane in which the vehicle travels;
a first control amount calculating section configured to calculate a first control amount for decreasing a lateral displacement deviation of the vehicle from the lateral direction displacement threshold value;
a second control amount calculating section configured to calculate a second control amount for decreasing an angle deviation of a travelling direction of the vehicle with respect to the traffic lane; and
a travelling direction controlling section configured to:
control at least one of a turning angle, a turning torque, a braking/driving amount, and a braking/driving force of a road wheel, on the basis of the second control amount when the vehicle is at a center side of the lateral direction displacement threshold value in a width direction of the traffic lane, and
control at least one of the turning angle, the turning torque, the braking/driving amount, and the braking/driving force of a road wheel, on the basis of at least the first control amount when the vehicle is at an outer side of the lateral direction displacement threshold value in a width direction of the traffic lane.

2. The lane keeping assist device as claimed in claim 1, wherein:
the lateral direction displacement threshold value setting section is configured to set at least two of the lateral direction displacement threshold values, and
the second control amount is calculated as a control amount of a preliminary control for reducing the first control amount, before the vehicle reaches either one of the lateral direction displacement threshold values from the lane center side.

3. The lane keeping assist device as claimed in claim 1, wherein, in at least a part of an area in a range of a lane edge side with respect to the lateral direction displacement threshold value, the travelling direction controlling section is configured to perform the control on the basis of both of the first control amount and the second control amount.

4. The lane keeping assist device as claimed in claim 3, wherein:
in a case where the vehicle travels in a direction moving away from the lateral direction displacement threshold value, directions of displacement of the vehicle by the first control amount and by the second control amount, with respect to the lateral direction displacement threshold value, become the same direction, and
in a case where the vehicle travels in a direction toward the lateral direction displacement threshold value, the directions of displacement of the vehicle by the first control amount and by the second control amount, with respect to the lateral direction displacement threshold value, become opposite directions.

5. The lane keeping assist device as claimed in claim 1, wherein:
the first control amount calculating section is configured to calculate a first target imaginary repulsion that is imaginarily applied to the vehicle from the lane edge side toward the lane center side to decrease the lateral displacement deviation, and calculates the first control amount on the basis of the first target imaginary repulsion, and
the second control amount calculating section is configured to calculate a second target imaginary repulsion that is imaginarily applied to the vehicle from the left and right width directions of the traffic lane to decrease the angle deviation, and calculates the second control amount on the basis of the second target imaginary repulsion.

6. The lane keeping assist device as claimed in claim 1, wherein:
left and right lateral displacement reference positions are set on inner sides of the left and right lateral direction displacement threshold values respectively, which are two positions that are each offset to left and right from the center of the width direction of the traffic lane,
the first control amount calculating section is configured to calculate the first control amount using the lateral displacement deviation from the lateral displacement reference position which is situated near the vehicle of the left and right lateral displacement reference positions, and
in a case where it is judged that the vehicle is positioned between the left and right lateral direction displacement threshold values, the lateral displacement deviation is considered to be zero, or a control gain for the lateral displacement deviation is set to be small.

7. The lane keeping assist device as claimed in claim 1, wherein:
the travelling direction controlling section is configured to calculate a final control amount from the sum of a value obtained by multiplying the first control amount by a first weighting factor and a value obtained by multiplying the second control amount by a second weighting factor, and
the first weighting factor and the second weighting factor are changed according to the lateral displacement deviation, and are set so that the larger the lateral displacement deviation is, the larger the first weighting factor is as compared with the second weighting factor.

8. The lane keeping assist device as claimed in claim 1, wherein the travelling direction controlling section is configured to compare values of the first control amount and the second control amount and sets the greater value as a final control amount.

9. The lane keeping assist device as claimed in claim 7, wherein the first control amount is corrected by a lateral displacement velocity of the vehicle.

10. The lane keeping assist device as claimed in claim 7, wherein:
a control gain of the second control amount is corrected by a distance of the vehicle to the traffic lane edge side which is located at a travelling direction side of the vehicle of the left and right traffic lane edge sides, and
the control gain is corrected so that the shorter the distance of the vehicle to the traffic lane edge side is, the larger the control gain is.

11. The lane keeping assist device as claimed in claim 1, wherein:
a curve road correcting section is configured to correct a control gain for the control amount calculated by the first control amount calculating section, on the basis of a position of the vehicle with respect to the center of the traffic lane and the curvature of the traffic lane, when a curvature of the traffic lane is a certain value or more, and wherein in a case where the vehicle is positioned at a curve inside of the traffic lane with respect to the width direction center of the traffic lane, when the curvature is large, the control gain is corrected and set to be small, as compared with small curvature, and in a case where the vehicle is positioned at a curve outside of the traffic lane with respect to the width direction center of the traffic lane, when the curvature is large, the control gain is corrected and set to be large, as compared with the small curvature.

12. The lane keeping assist device as claimed in claim 1, wherein:

a zone between a position that is offset to the lane center side from the lateral direction displacement threshold value and this lateral direction displacement threshold value is set as a departure side transition area, and in an area on the lane center side with respect to the departure side transition area, the second control amount is set to zero.

13. A vehicle travelling direction control device comprising:

a lateral direction position information obtaining section configured to obtain information concerning a lateral direction position of a target vehicle with respect to a traffic lane;

a lateral direction displacement threshold value setting section configured to set a first lateral direction displacement threshold value and a second lateral direction displacement threshold value on the traffic lane where the target vehicle travels;

a first control amount calculating section configured to calculate a first control amount for decreasing a lateral displacement deviation of the target vehicle from the first or second lateral direction displacement threshold value;

a second control amount calculating section configured to calculate a second control amount for decreasing an angle deviation of a travelling direction of the target vehicle with respect to the traffic lane; and a lateral direction displacement threshold value passing judging section configured to judge whether or not the lateral direction position exceeds either of the lateral direction displacement threshold values across a range of the first and second lateral direction displacement threshold values, wherein, in a case where it is judged that the lateral direction position does not exceed the lateral direction displacement threshold value, a command signal of a second control that controls the angle deviation is outputted, and wherein, in a case where it is judged that the lateral direction position exceeds the lateral direction displacement threshold value, at least a command signal of a first control that controls the lateral direction position is outputted.

14. The vehicle travelling direction control device as claimed in claim 13, wherein, in a part of an area where the lateral direction position exceeds the lateral direction displacement threshold value, both command signals of the first control and the second control are outputted.

15. The vehicle travelling direction control device as claimed in claim 14, wherein weights of the control amount of the first control and the control amount of the second control are changed according to the lateral direction position out of the lateral direction displacement threshold value.

16. The vehicle travelling direction control device as claimed in claim 15, wherein the weights are set so that the farther the lateral direction position is positioned away from the lateral direction displacement threshold value, the larger the weight of the control amount of the first control as compared with the weight of the control amount of the second control.

17. The vehicle travelling direction control device as claimed in claim 14, wherein:

in a case where the lateral direction position is positioned in a direction moving vehicle moves in a direction away from the lateral direction displacement threshold value, directions of both control amounts of the first control and the second control become the same direction, and in a case where the vehicle moves in a direction toward the lateral direction displacement threshold value, the directions of the control amounts of the first control and the second control become opposite directions.

18. A lane keeping assist method comprising:

obtaining information concerning a lateral direction displacement of a vehicle with respect to a traffic lane, and setting a lateral direction displacement threshold value on the traffic lane where the vehicle travels, and when the vehicle is at a center side of the lateral direction displacement threshold value in a width direction of the traffic lane, controlling a travelling direction of the vehicle so as to decrease an angle deviation of the travelling direction of the vehicle with respect to the traffic lane, and when the vehicle is at an outer side of the lateral direction displacement threshold value in a width direction of the traffic lane, controlling the travelling direction of the vehicle so as to decrease at least a lateral displacement deviation of the vehicle from the lateral direction displacement threshold value.

19. A lane keeping assist method comprising:

calculating a first control amount for decreasing a lateral displacement of a vehicle with respect to a center of a traffic lane;

calculating a second control amount for decreasing an angle deviation of a travelling direction of the vehicle with respect to the traffic lane;

controlling at least one of a braking/driving amount, a braking/driving force of the vehicle, a turning angle, and a turning torque of a road wheel on the basis of the first control amount and the second control amount;

setting the first control amount used when the vehicle travels at a center side of the traffic lane to be smaller than the first control amount used when the vehicle travels outside the center side of the traffic lane; and setting the second control amount used when the vehicle travels at the center side of the traffic lane to be greater than the second control amount used when the vehicle travels outside the center side of the traffic lane.

20. A lane keeping assist method comprising:

calculating, on the basis of a lateral direction displacement of a vehicle with respect to a traffic lane and a first control gain, a first control amount for decreasing a lateral displacement of the vehicle with respect to a center of the traffic lane;

calculating, on the basis of an angle of a travelling direction of the vehicle with respect to the traffic lane and a second control gain, a second control amount for decreasing an angle deviation of the travelling direction of the vehicle;

controlling at least one of a braking/driving amount, a braking/driving force of the vehicle, a turning angle, and a turning torque of a road wheel on the basis of the first control amount and the second control amount; and setting the first control gain for a case where the vehicle travels at a center side of the traffic lane to be smaller than the first control gain for a case where the vehicle travels outside the center side of the traffic lane.

21. The lane keeping assist method as claimed in claim 20, further comprising setting the second control gain for the case where the vehicle travels at the center side of the traffic lane to be greater than the second control gain for the case where the vehicle travels at the outer side of the traffic lane.

22. The lane keeping assist method as claimed in claim 20, wherein the first control gain for the case where the vehicle travels at the center side of the traffic lane is set to zero.

23. The lane keeping assist device as claimed in claim 1, wherein the travelling direction controlling section is configured to perform the control of the at least one of the turning angle, the turning torque, the braking/driving amount, and the braking/driving force of a road wheel while the vehicle is in the process of moving from the center side of the lateral direction displacement threshold to the outer side of the lateral direction displacement threshold value.

24. The lane keeping assist method as claimed in claim 18, wherein the travelling direction of the vehicle is controlled while the vehicle is in the process of moving from the center side of the lateral direction displacement threshold to the outer side of the lateral direction displacement threshold value.

25. A lane keeping assist device comprising:
a lateral direction displacement obtaining section which obtains information concerning a lateral direction displacement of a vehicle with respect to a traffic lane;
a lateral direction displacement threshold value setting section which sets a lateral direction displacement threshold value on the traffic lane where the vehicle travels;
a first control amount calculating section which calculates a first control amount for decreasing a lateral displacement of the vehicle with respect to a center of the traffic lane on the basis of the information concerning the lateral direction displacement and the lateral direction displacement threshold value;
a second control amount calculating section which calculates a second control amount for decreasing an angle deviation of a travelling direction of the vehicle with respect to the traffic lane; and
a travelling direction controlling section which,
in a case where the vehicle travels at a center side in a width direction with respect to the lateral direction displacement threshold value, performs a control that heads the vehicle to the travelling direction by controlling a braking/driving amount or a braking/driving force of the vehicle or a turning angle or a turning torque of a road wheel on the basis of the second control amount, and
in a case where the vehicle deviates to an outer side in the width direction with respect to the lateral direction displacement threshold value, performs a control that returns the vehicle to the center side of the traffic lane by controlling the braking/driving amount or the braking/driving force of the vehicle or the turning angle or the turning torque of the road wheel on the basis of the first control amount.

26. The lane keeping assist device as claimed in claim 25, wherein, in a case where the vehicle travels at the center side in the width direction with respect to the lateral direction displacement threshold value, the travelling direction controlling section controls the braking/driving amount or the braking/driving force of the vehicle or the turning angle or the turning torque of the road wheel while predominantly setting the second control amount and by further adding the first control amount.

27. The lane keeping assist device as claimed in claim 25, wherein, in a case where the vehicle deviates to the outer side in the width direction with respect to the lateral direction displacement threshold value, the travelling direction controlling section controls the braking/driving amount or the braking/driving force of the vehicle or the turning angle or the turning torque of the road wheel while predominantly setting the first control amount and by further adding the second control amount.

28. A lane keeping assist method comprising:
obtaining information concerning a lateral direction displacement of a vehicle with respect to a traffic lane, and setting a lateral direction displacement threshold value on the traffic lane where the vehicle travels;
in a case where the vehicle travels at a center side in a width direction with respect to the lateral direction displacement threshold value, performing a control that heads the vehicle to a travelling direction by controlling a braking/driving amount or a braking/driving force of the vehicle or a turning angle or a turning torque of a road wheel on the basis of a second control amount to decrease an angle deviation of the travelling direction of the vehicle with respect to the traffic lane; and
in a case where the vehicle deviates to an outer side in the width direction with respect to the lateral direction displacement threshold value, performing a control that returns the vehicle to the center side of the traffic lane by controlling the braking/driving amount or the braking/driving force of the vehicle or the turning angle or the turning torque of the road wheel on the basis of a first control amount to decrease a lateral displacement of the vehicle with respect to a center of the traffic lane.

* * * * *